(12) United States Patent
Sampsell

(10) Patent No.: US 7,684,106 B2
(45) Date of Patent: Mar. 23, 2010

(54) COMPATIBLE MEMS SWITCH ARCHITECTURE

(75) Inventor: Jeffrey B. Sampsell, Pueblo West, CO (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 508 days.

(21) Appl. No.: 11/591,809

(22) Filed: Nov. 2, 2006

(65) Prior Publication Data

US 2008/0121503 A1    May 29, 2008

(51) Int. Cl.
G02B 26/00    (2006.01)

(52) U.S. Cl. ................. 359/295; 359/290; 324/415; 345/31; 345/80; 345/85; 257/E27.111; 200/61.45 R

(58) Field of Classification Search ......... 359/290–295, 359/298, 237, 245; 349/104, 149, 152, 153, 349/155, 190, 192; 345/31, 55, 60, 76, 80, 345/85, 206; 73/514.16–514.36; 335/78; 29/622; 324/415, 457; 200/61.49, 61.45 M, 200/61.45 R, 181, 512; 257/414, 415, E27.111; 385/147; 445/24

See application file for complete search history.

(56) References Cited

U.S. PATENT DOCUMENTS

| | | | |
|---|---|---|---|
| 4,425,572 A | 1/1984 | Takafuji et al. |
| 4,672,254 A | 6/1987 | Dolat et al. |
| 4,681,403 A | 7/1987 | te Velde et al. |
| 4,880,493 A | 11/1989 | Ashby et al. |
| 4,895,500 A | 1/1990 | Hok et al. |
| 4,896,033 A | 1/1990 | Gautier |
| 5,014,259 A | 5/1991 | Goldberg et al. |
| 5,170,283 A | 12/1992 | O'Brien et al. |
| 5,285,196 A | 2/1994 | Gale |
| 5,454,904 A | 10/1995 | Ghezzo et al. |
| 5,485,304 A | 1/1996 | Kaeriyama |
| 5,526,951 A | 6/1996 | Bailey et al. |
| 5,528,707 A | 6/1996 | Sullivan et al. |
| 5,619,061 A | 4/1997 | Goldsmith et al. |

(Continued)

FOREIGN PATENT DOCUMENTS

EP        0 071 287        2/1983

(Continued)

OTHER PUBLICATIONS

Chunjun Wang et al., "Flexible Curcuit-Based RF MEMS Switches," Proceedings of 2001 ASME International Mechanical Engineering Congress and Exposition, pp. 757-762, Nov. 11-16, 2001.

(Continued)

Primary Examiner—Loha Ben
(74) Attorney, Agent, or Firm—Knobbe Martens Olson & Bear, LLP

(57) ABSTRACT

A method of fabricating a display device includes forming a switch and forming a plurality of display elements in parallel electrical communication with the switch. The switch includes an electrode, a first contact, and a second contact. The switch is responsive to voltages applied to the electrode to selectively place the first contact and the second contact in communication with one another. Forming the switch includes a first set of patterning steps. Forming the plurality of display elements includes a second set of patterning steps. The second set of patterning steps includes the first set of patterning steps.

52 Claims, 16 Drawing Sheets

U.S. PATENT DOCUMENTS

| | | | |
|---|---|---|---|
| 5,638,946 A | 6/1997 | Zavracky | |
| 5,673,785 A | 10/1997 | Schlaak et al. | |
| 5,677,783 A | 10/1997 | Bloom et al. | |
| 5,734,177 A * | 3/1998 | Sakamoto | 257/49 |
| 5,771,321 A | 6/1998 | Stern | |
| 5,795,208 A | 8/1998 | Hattori | |
| 5,881,449 A | 3/1999 | Ghosh et al. | |
| 5,949,571 A | 9/1999 | Goossen et al. | |
| 6,002,661 A | 12/1999 | Abe et al. | |
| 6,040,937 A | 3/2000 | Miles | |
| 6,065,424 A | 5/2000 | Shacham-Diamand et al. | |
| 6,154,586 A | 11/2000 | MacDonald et al. | |
| 6,195,196 B1 | 2/2001 | Kimura et al. | |
| 6,323,923 B1 | 11/2001 | Hoshino et al. | |
| 6,353,489 B1 | 3/2002 | Popovich et al. | |
| 6,376,787 B1 | 4/2002 | Martin et al. | |
| 6,392,618 B1 * | 5/2002 | Kimura | 345/85 |
| 6,407,851 B1 | 6/2002 | Islam et al. | |
| 6,535,663 B1 | 3/2003 | Chertkow | |
| 6,556,338 B2 | 4/2003 | Han et al. | |
| 6,608,268 B1 | 8/2003 | Goldsmith | |
| 6,657,832 B2 | 12/2003 | Williams et al. | |
| 6,674,562 B1 | 1/2004 | Miles et al. | |
| 6,787,438 B1 | 9/2004 | Nelson | |
| 6,791,735 B2 | 9/2004 | Stappaerts | |
| 6,807,892 B2 | 10/2004 | Biegelsen et al. | |
| 6,876,047 B2 * | 4/2005 | Cunningham et al. | 257/415 |
| 6,876,482 B2 * | 4/2005 | DeReus | 359/290 |
| 7,046,422 B2 * | 5/2006 | Kimura et al. | 359/295 |
| 7,053,737 B2 | 5/2006 | Schwartz et al. | |
| 7,123,216 B1 | 10/2006 | Miles | |
| 7,235,914 B2 | 6/2007 | Richards et al. | |
| 7,439,943 B2 * | 10/2008 | Nakanishi | 345/80 |
| 7,479,785 B2 * | 1/2009 | Liu et al. | 324/415 |
| 7,583,350 B2 * | 9/2009 | Chang et al. | 349/153 |
| 2001/0001080 A1 | 5/2001 | Eldridge et al. | |
| 2003/0210851 A1 | 11/2003 | Fu et al. | |
| 2004/0107775 A1 | 6/2004 | Kim | |
| 2005/0002082 A1 | 1/2005 | Miles | |
| 2005/0241394 A1 | 11/2005 | Clark | |
| 2006/0033975 A1 | 2/2006 | Miles | |
| 2006/0066935 A1 | 3/2006 | Cummings et al. | |
| 2006/0077533 A1 | 4/2006 | Miles et al. | |
| 2007/0020948 A1 | 1/2007 | Piehl et al. | |
| 2009/0068781 A1 | 3/2009 | Tung et al. | |
| 2009/0213451 A1 | 8/2009 | Tung et al. | |

FOREIGN PATENT DOCUMENTS

| | | |
|---|---|---|
| EP | 1 146 533 | 10/2001 |
| EP | 1 172 681 | 1/2002 |
| EP | 1 640 960 | 3/2006 |
| FR | 2 843 230 | 2/2004 |
| JP | 8-292382 | 11/1996 |
| JP | 2003-340795 | 2/2003 |
| JP | 2005-234515 | 9/2005 |
| WO | WO 95/03562 | 2/1995 |
| WO | WO 98/52224 | 11/1998 |
| WO | WO 02/063682 | 8/2002 |
| WO | WO 02/079853 | 10/2002 |
| WO | WO 03/041133 | 5/2003 |
| WO | WO 03/079384 | 9/2003 |
| WO | WO 2005/006364 A1 | 1/2005 |
| WO | WO 2007/053438 | 5/2007 |

OTHER PUBLICATIONS

Panitz et al., Electrostatic actuated interference filters as optical switches for projection display applications, The 12th International Conference on Solid state Sensors, Actuators and Microsystems, Jun. 8-12, 2003, pp. 580-582.

ISR and WO for PCT/US07/022587 filed Oct. 25, 2007.

International Preliminary Report on Patentability for PCT Application No. PCT/US2007/022587, dated May 14, 2009.

* cited by examiner

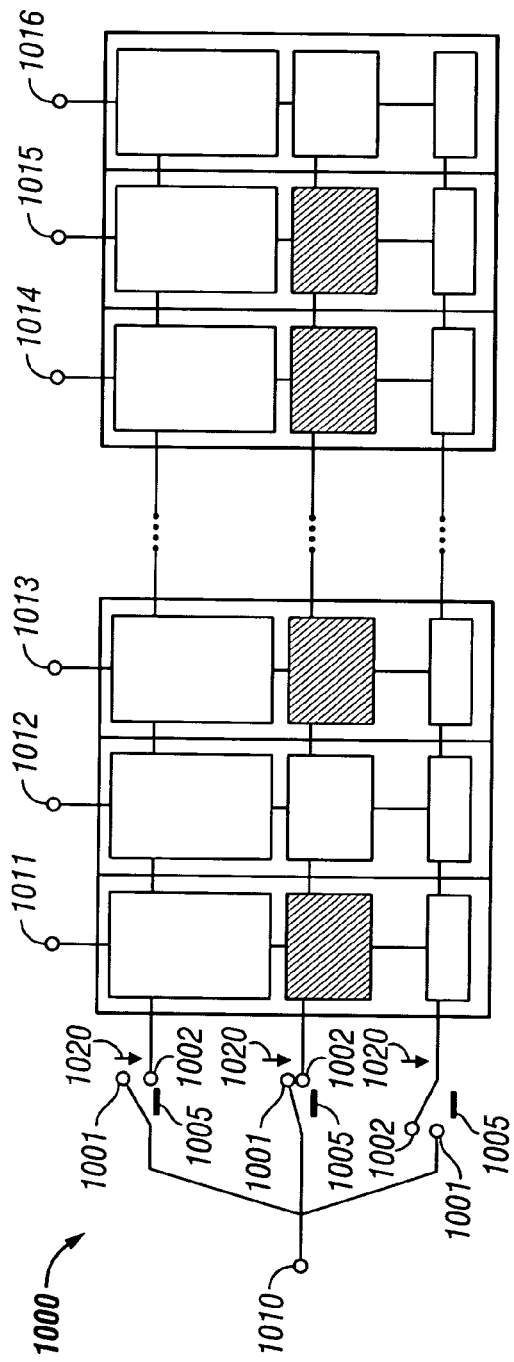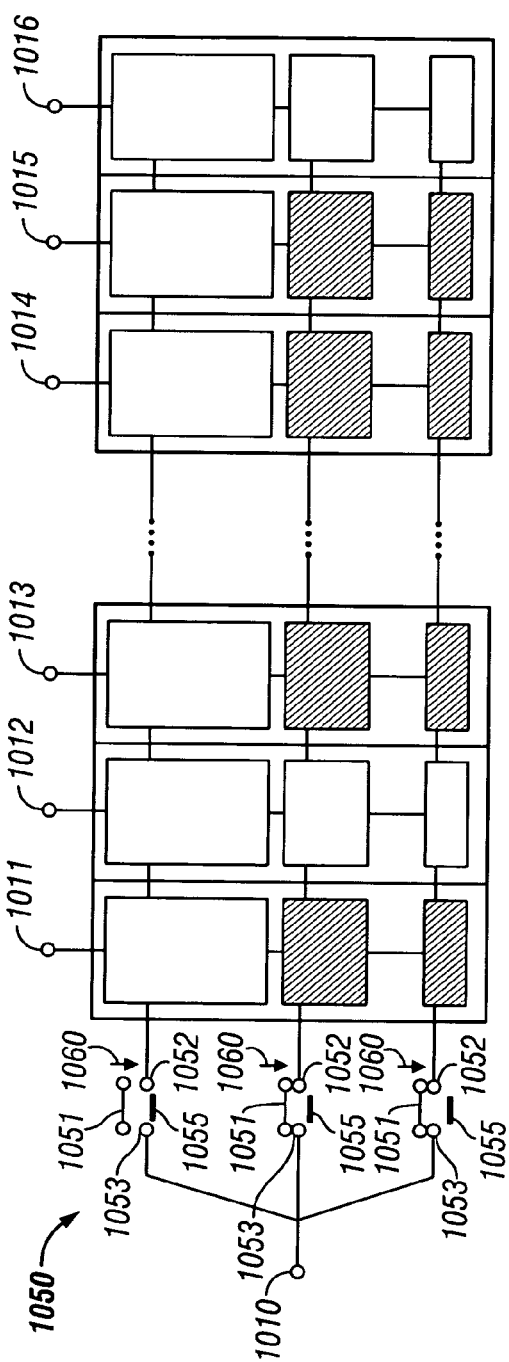

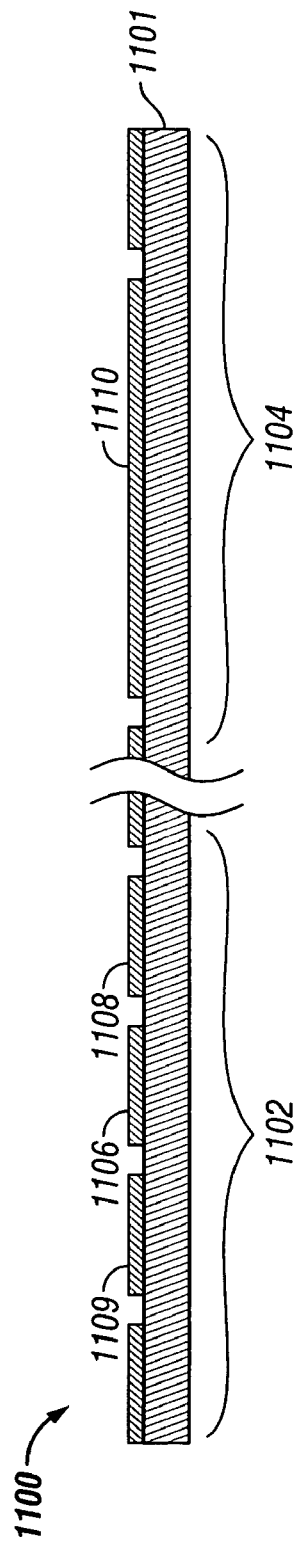
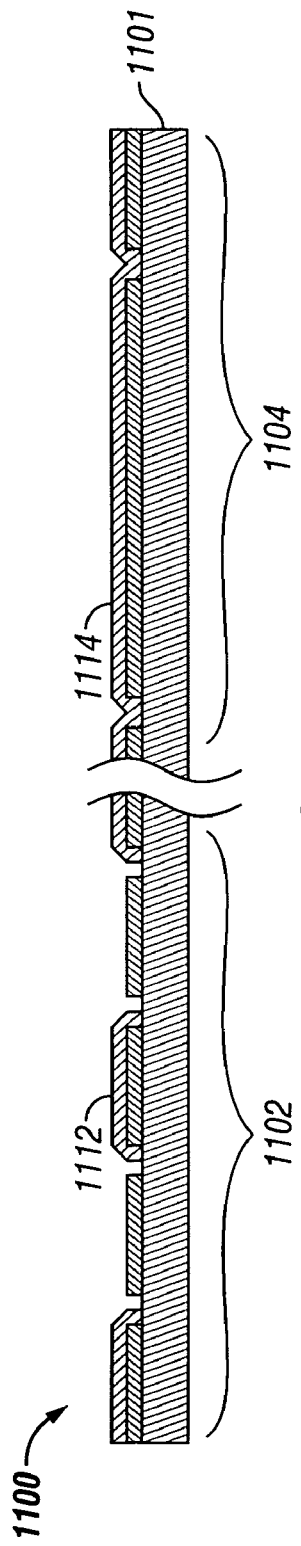
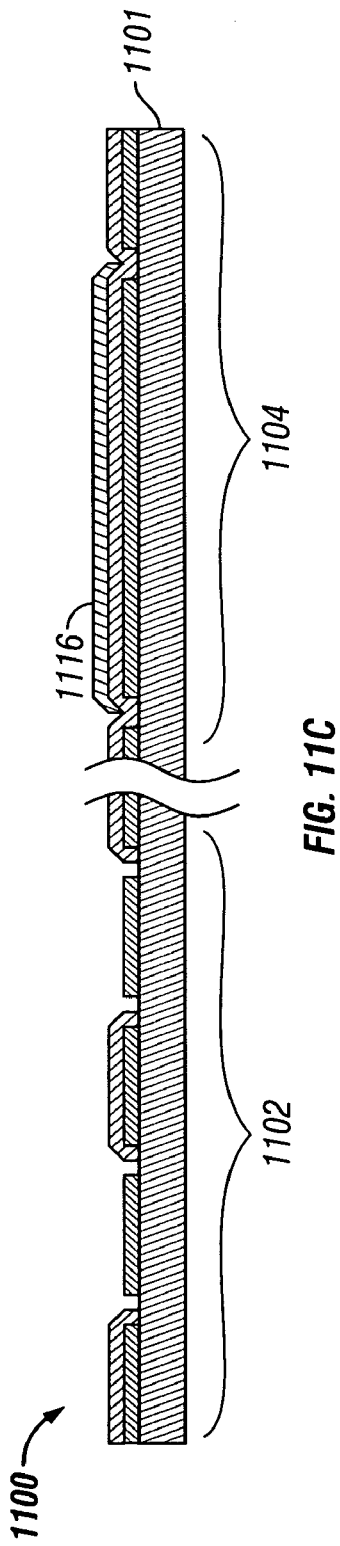

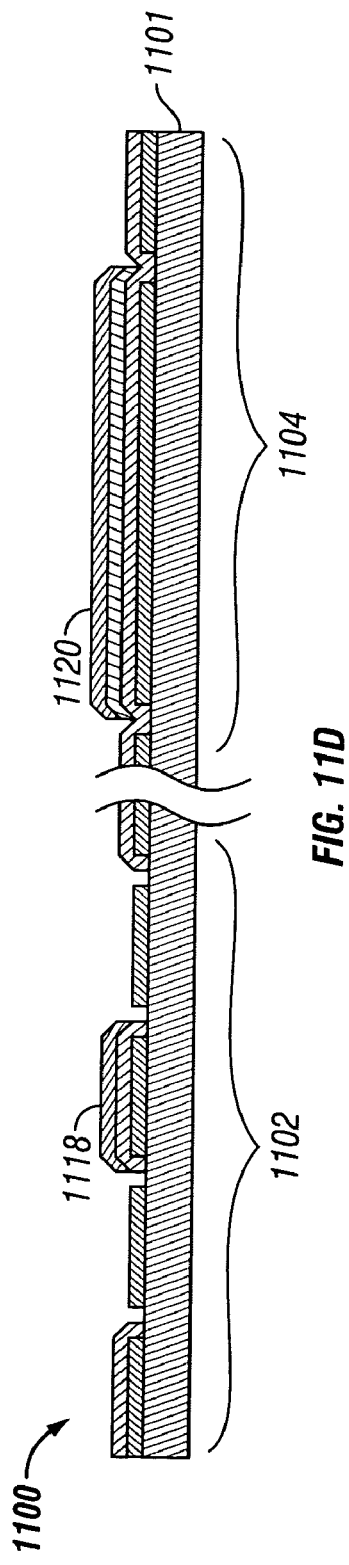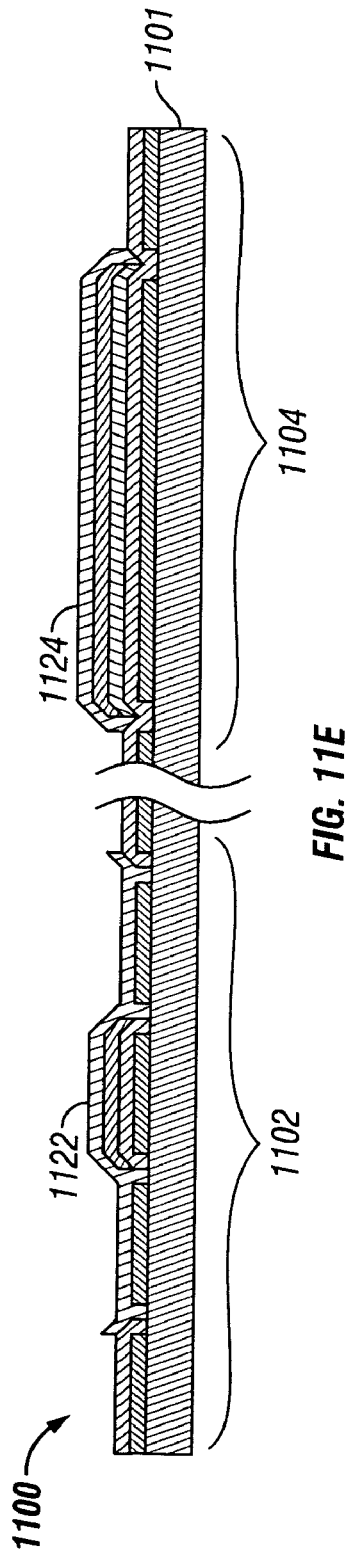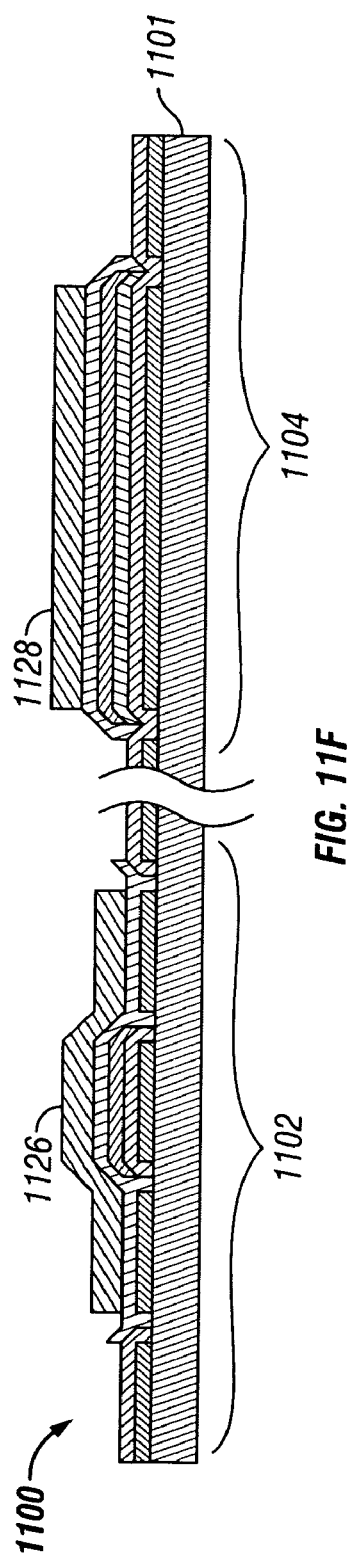

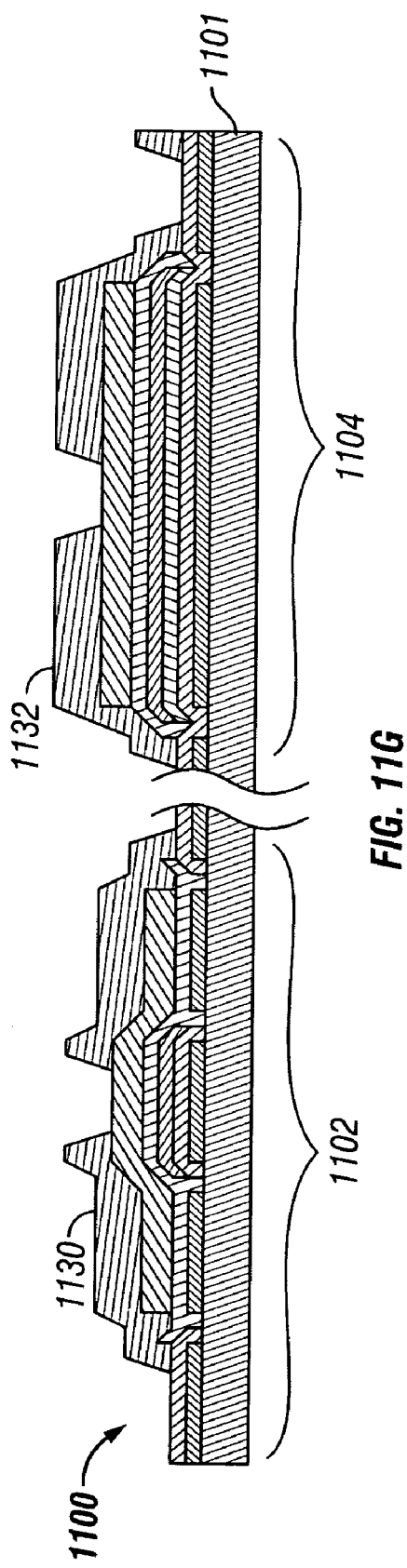
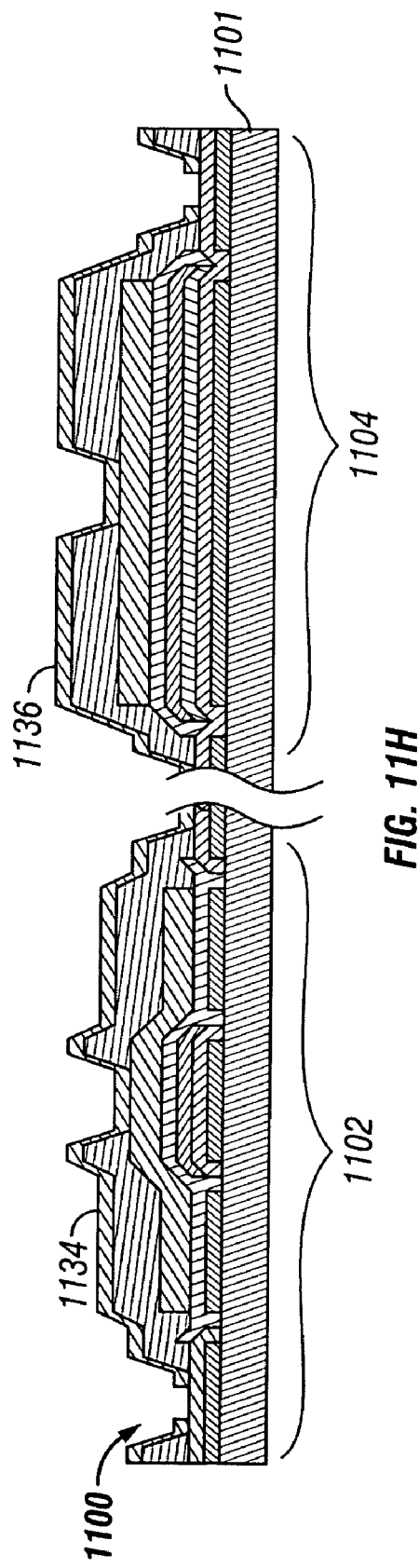
FIG. 11G
FIG. 11H

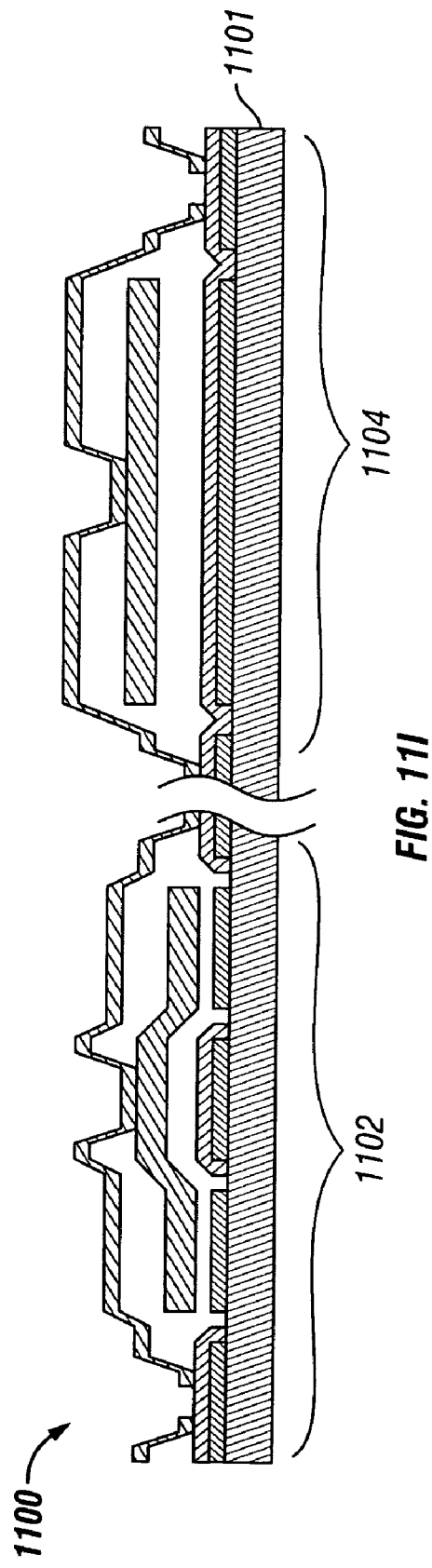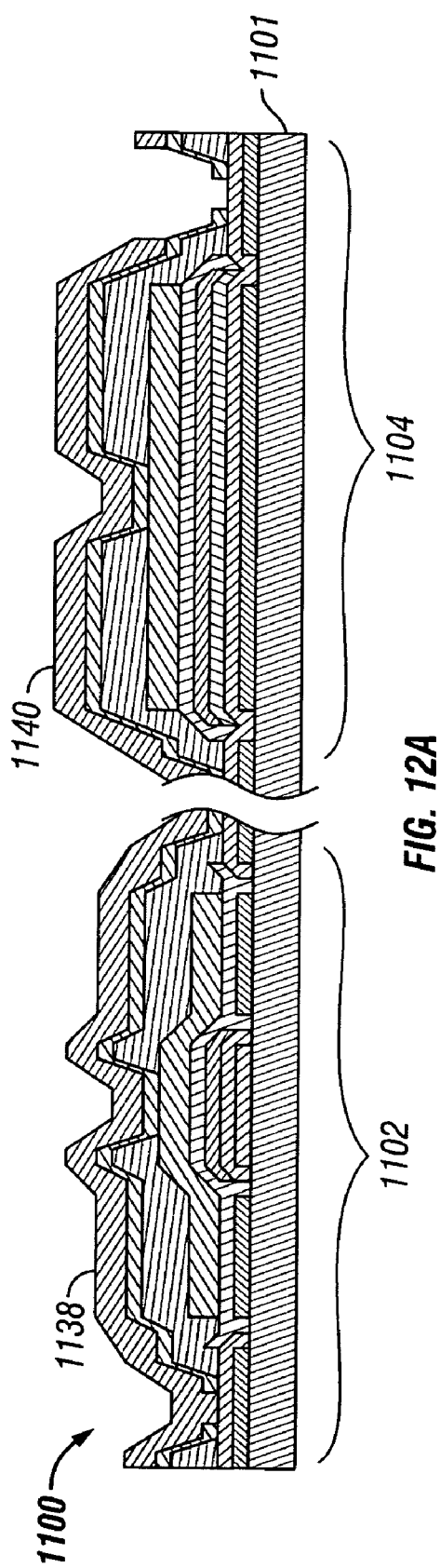

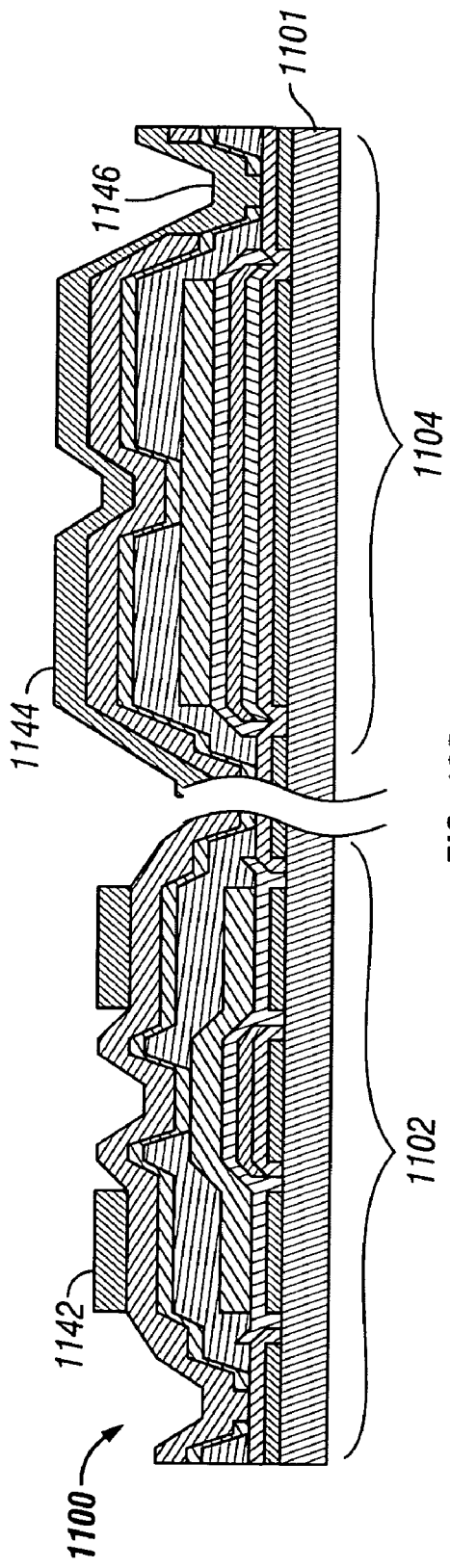
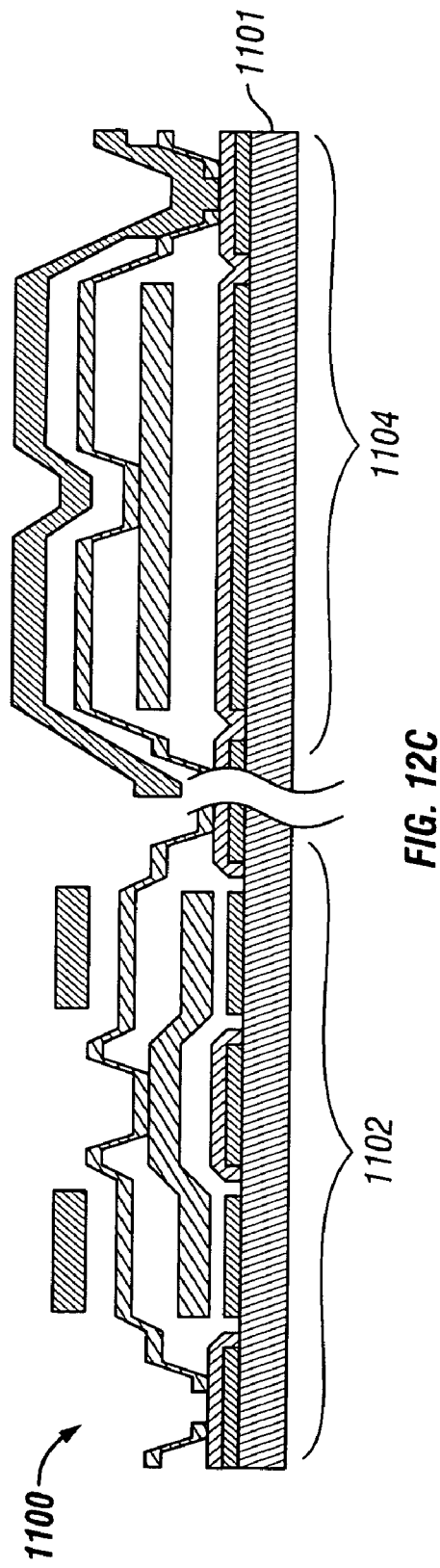
FIG. 12B
FIG. 12C

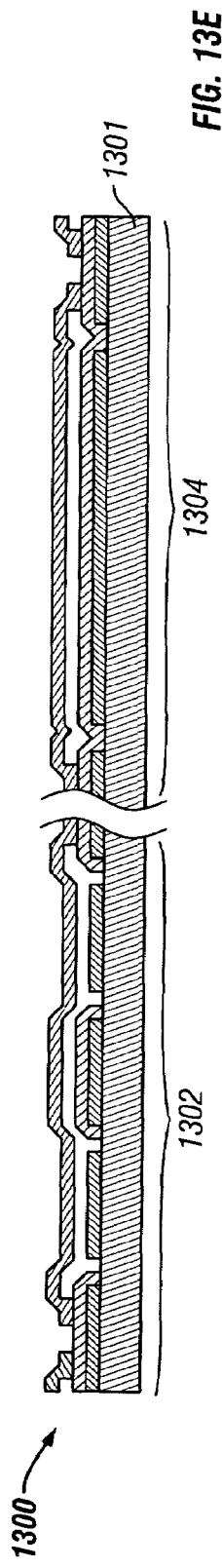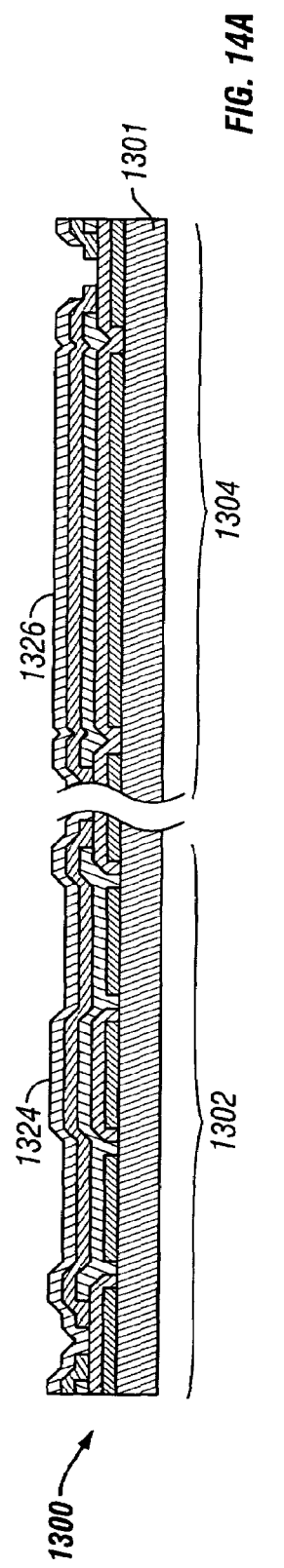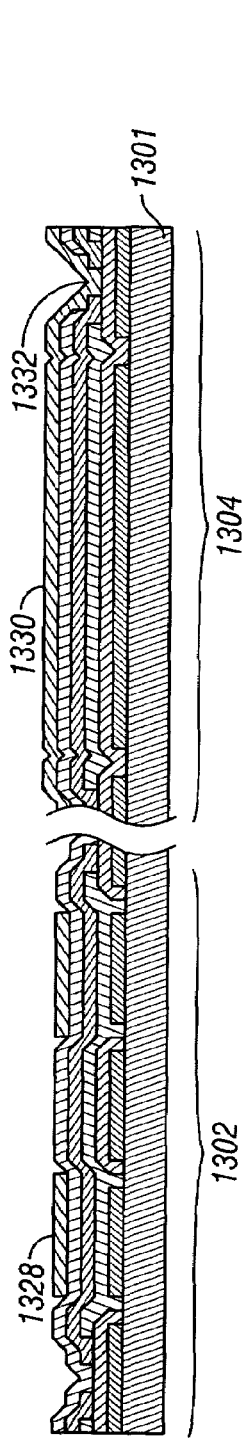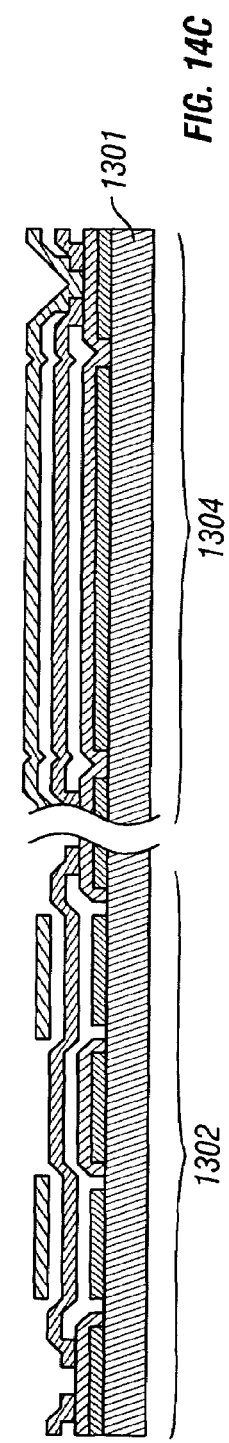

US 7,684,106 B2

COMPATIBLE MEMS SWITCH ARCHITECTURE

BACKGROUND

1. Field

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator (iMod). As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In certain embodiments, a method of fabricating a display device comprises forming a switch and forming a plurality of display elements in parallel electrical communication with the switch. The switch comprises an electrode, a first contact, and a second contact. The switch is responsive to voltages applied to the electrode to selectively place the first contact and the second contact in communication with one another. Forming the switch comprises a first set of patterning steps. Forming the plurality of display elements comprises a second set of patterning steps. The second set of patterning steps comprises the first set of patterning steps.

In certain embodiments, a method of fabricating a display device comprises forming a switch and forming a plurality of display elements. The switch comprises a first electrode, a second electrode, a first contact, and a second contact. Forming the switch comprises using a first set of patterning steps. The switch is responsive to voltages applied to the first electrode in order to move the first contact into electrical communication with the second contact. The switch is further responsive to voltages applied to the second electrode to move the first contact and the second contact out of electrical communication. Forming the second electrode comprises a third set of patterning steps. The first set of patterning steps comprises the third set of patterning steps. The plurality of display elements comprises a bus structure. The plurality of display elements are in parallel electrical communication with the switch. Forming the plurality of display elements comprises using a second set of patterning steps. Forming the bus structure comprises a fourth set of patterning steps. The second set of patterning steps comprises the fourth set of patterning steps. The fourth set of patterning steps comprises the third set of patterning steps.

In certain embodiments, a microelectromechanical (MEMS) switch comprises a first electrode, a second electrode, and a movable structure. The movable structure is between the first electrode and the second electrode. The movable structure has a first contact. The movable structure is responsive to voltages applied to the first electrode to selectively move such that the first contact is in electrical communication with a second contact and is responsive to voltages applied to the second electrode to selectively move such that the first contact and the second contact are not in electrical communication.

BRIEF DESCRIPTION OF THE DRAWINGS

FIGS. 10A and 10B illustrate example embodiments of a display for displaying a color image including nine interferometric modulators for each pixel and switches that multiplex among the interferometric modulators.

FIGS. 11A through 11I are cross sections of an embodiment of a switch and a plurality of display elements during various stages of processing.

FIGS. 12A through 12C are cross sections of an embodiment of a switch and a plurality of display elements during various other stages of processing.

FIGS. 13A through 13E are cross sections of another embodiment of a switch and a plurality of display elements during various stages of processing.

FIGS. 14A through 14C are cross sections of another embodiment of a switch and a plurality of display elements during various other stages of processing.

DETAILED DESCRIPTION OF THE PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Methods are provided that form a switch and a plurality of display elements using the same set of patterning steps and materials. Using the same steps used to form a display element to also form a switch allows for a decrease in the number of total patterning steps to fabricate the display device as compared to other fabrication processes in which additional patterning and other steps dedicated to forming the switch are performed in addition to those used for fabricating the display elements. In some embodiments, the switch and the display elements comprise a deformable layer and a conductive layer. In some embodiments, the switch and the display elements comprise a layer that is deformable and conductive. The portion of the switch bar attracted by an electrode may advantageously not be insulated from the contacting portion of the switch bar. Additionally, methods are provided that form a second electrode over the switch and that form a bus structure over the plurality of display elements using the same set of patterning steps and materials. A switch comprising a second electrode can compensate for the potential side-effects of using the same set of patterning steps to form the switch and the display elements. In certain embodiments in which some patterning and other steps are dedicated to forming the switch, a switch comprising a second electrode allows a decrease in the number of total patterning steps in the fabrication processes.

Figure 1:
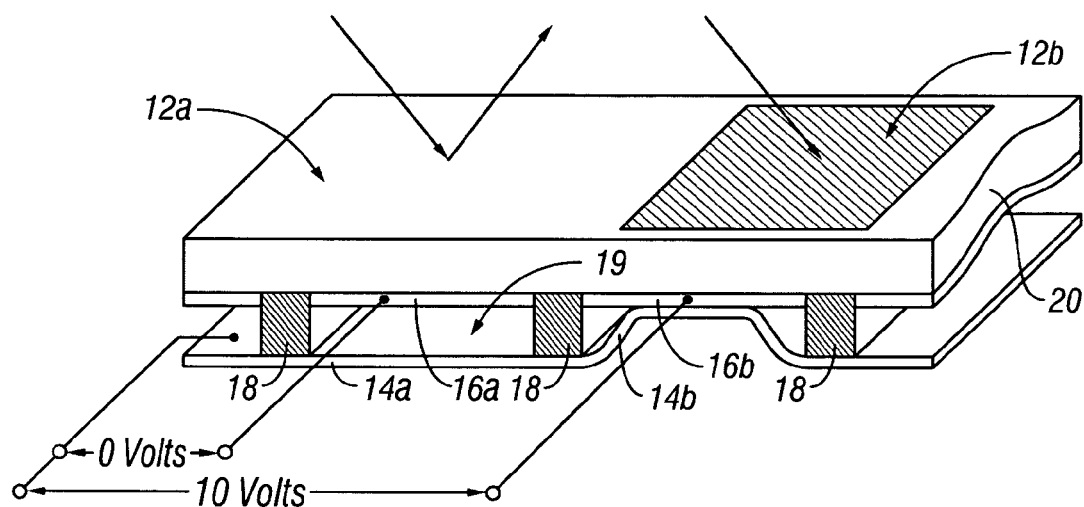
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and, partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
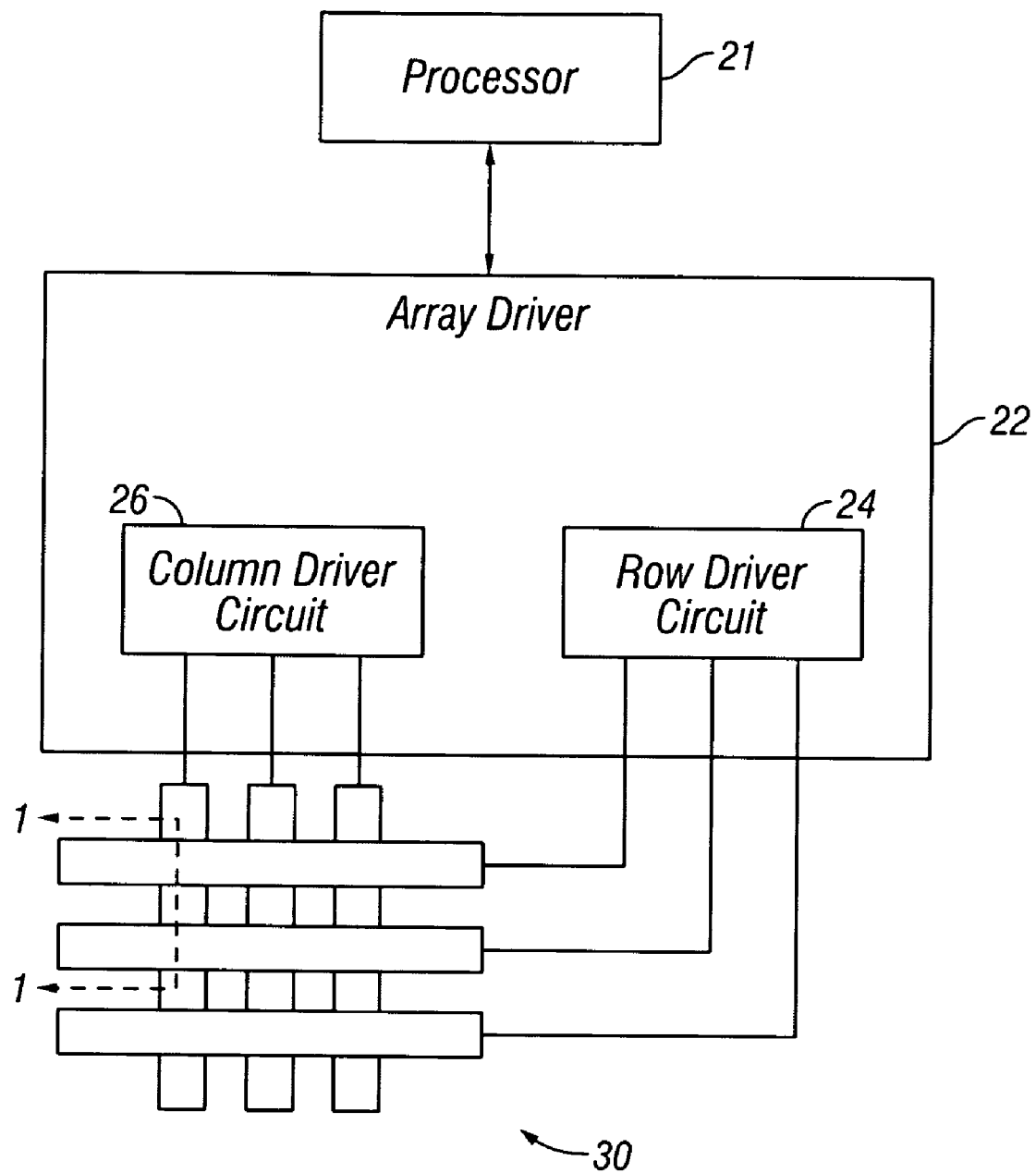
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
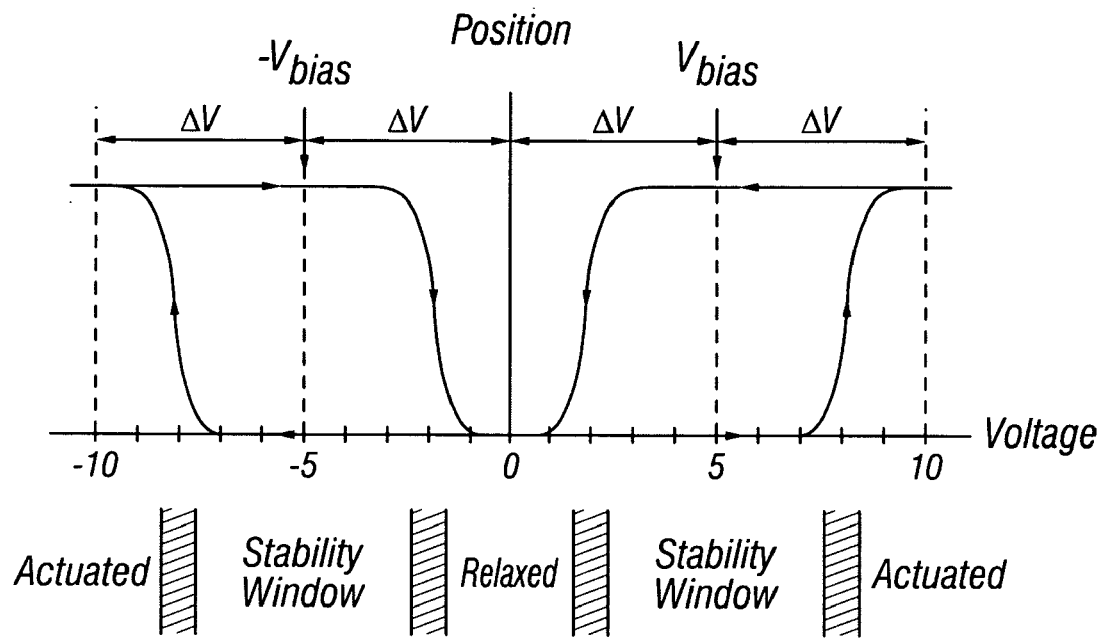
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
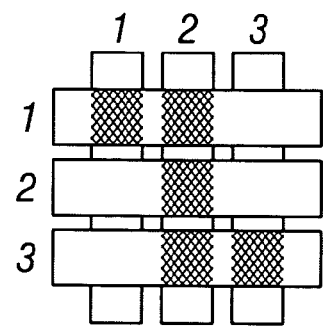
FIG. 5A illustrates one exemplary frame of display data in the 3×3 interferometric modulator display of FIG. 2.
Figure 5B:
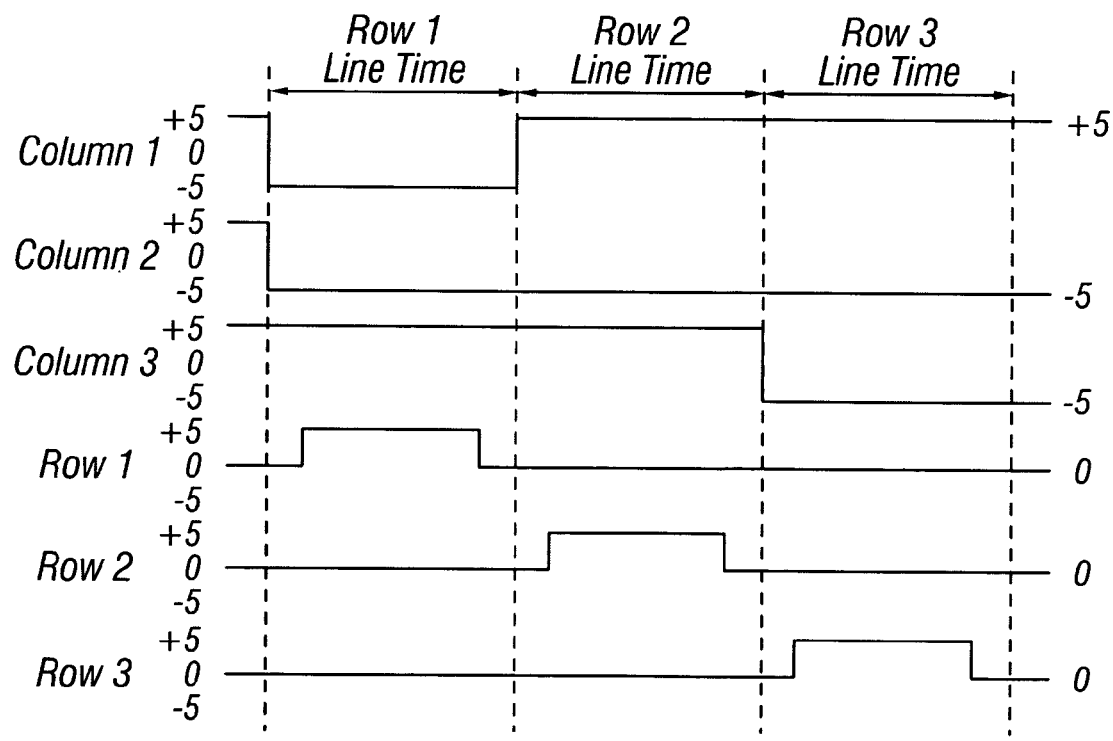
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
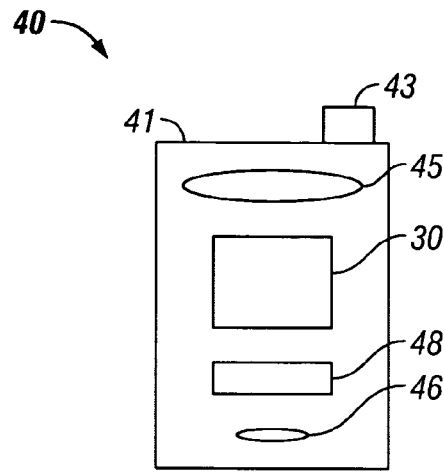
FIGS. 6A and 6B are system block diagrams illustrating an embodiment of a visual display device comprising a plurality of interferometric modulators.
Figure 6B:
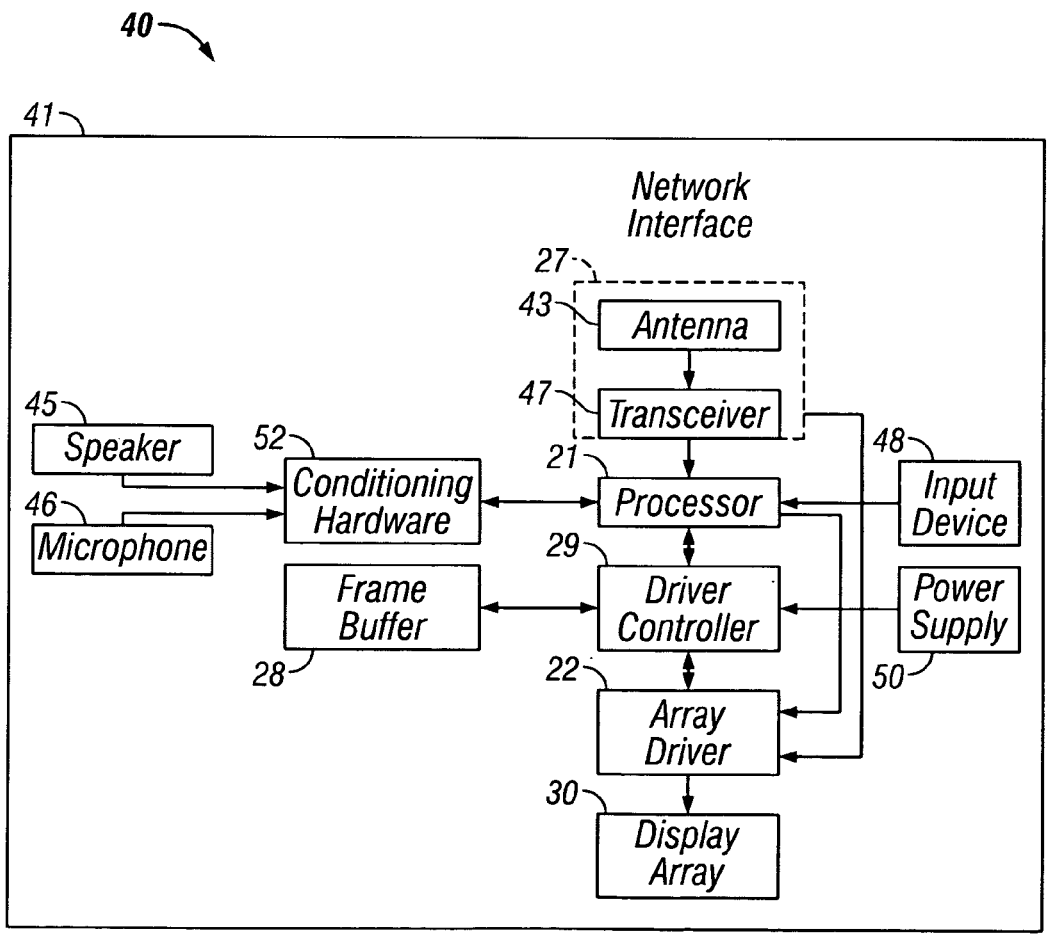

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disk drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
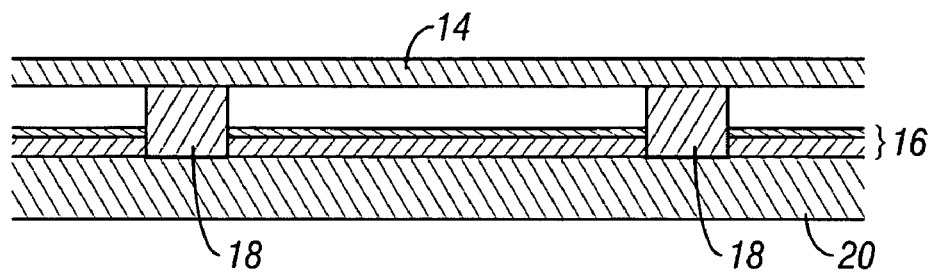
FIG. 7A is a cross section of the device of FIG. 1.
Figure 7B:
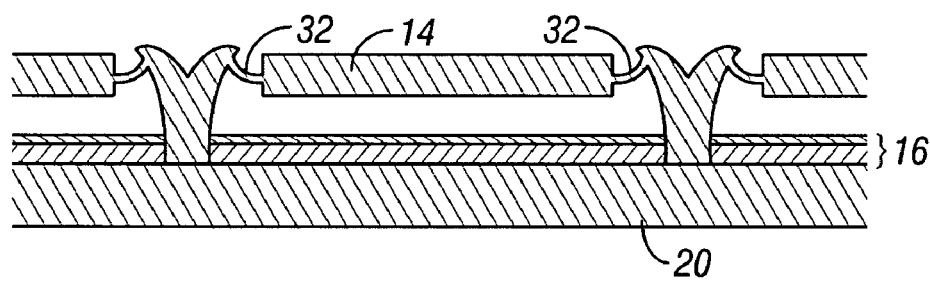
FIG. 7B is a cross section of an alternative embodiment of an interferometric modulator.
Figure 7C:
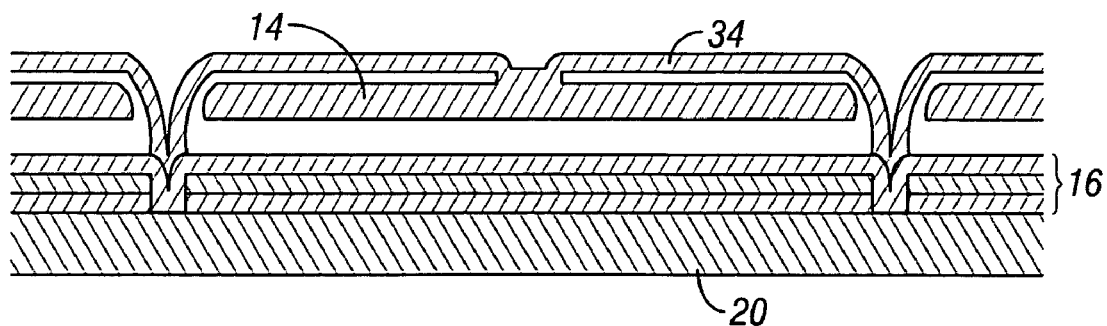
FIG. 7C is a cross section of another alternative embodiment of an interferometric modulator.
Figure 7D:
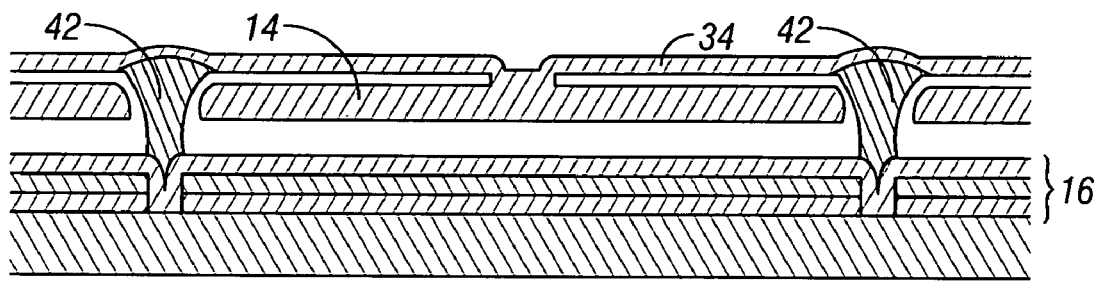
FIG. 7D is a cross section of yet another alternative embodiment of an interferometric modulator.
Figure 7E:
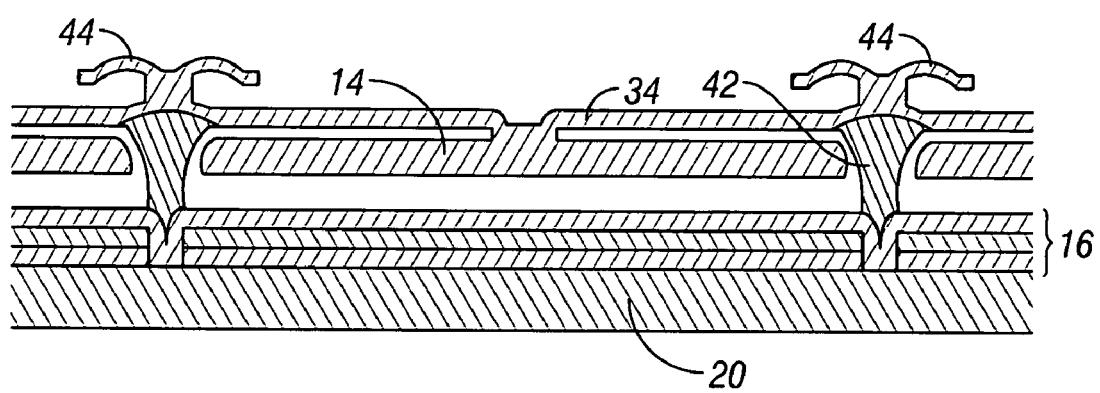
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
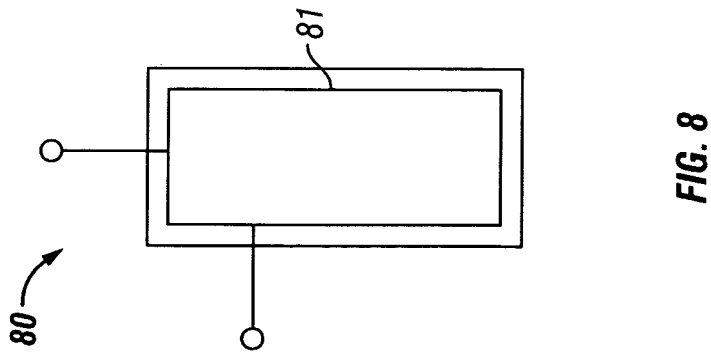
FIG. 8 illustrates an example embodiment of a monochrome display including one interferometric modulator per pixel.

FIG. 8 illustrates an example embodiment of a monochrome display 80 including one interferometric modulator 81 per pixel, the "on" or "off" state of the interferometric modulator 81 being set based on the value of the one bit of data per pixel. The pixel is configured to communicate with one column conduit and one row conduit.

Figure 9B:
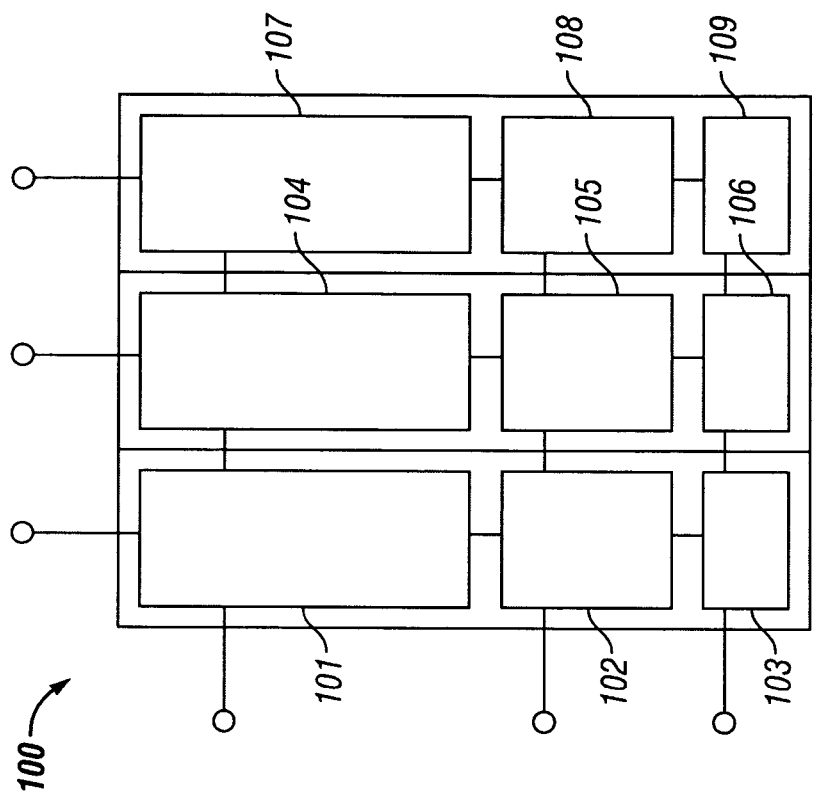
FIG. 9B illustrates an example embodiment of a display for displaying a color image including nine interferometric modulators for each pixel.
Figure 9A:
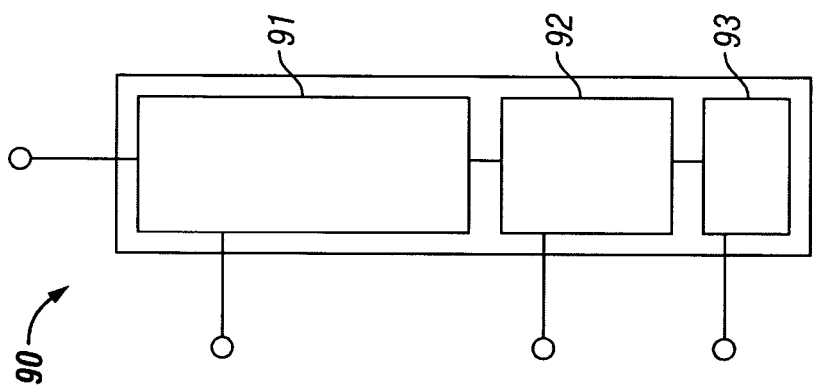
FIG. 9A illustrates an example embodiment of a display for displaying a grayscale image including three interferometric modulators for each pixel.

FIG. 9A illustrates an example embodiment of a display 90 for displaying a grayscale image including three interferometric modulators 91, 92, 93 for each pixel. A grayscale image may include several bits of data per pixel. For example, a "3-bit" grayscale display includes three bits of data per pixel that correspond to one of eight ($2^3$) shades of gray that may be assigned to each pixel. The pixel is configured to communicate with one column conduit and three row conduits. To obtain the eight shades, the three modulators 91, 92, 93 reflect light according to a varying size ratio. In one such embodiment, each of the interferometric modulators 91, 92, 93 includes mirrors having a reflective surface area that varies according to the ratio of 4:2:1. The reflective portion of one mirror or modulator may be referred to as "subtending" a portion of the pixel. For example, the mirror with a surface area of one in the 4:2:1 embodiment subtends about $\frac{1}{7}$ of the pixel. A particular shade in a pixel is obtained by setting each modulator to an "on" or "off" state based on the binary value of a corresponding bit of the three bits of data.

FIG. 9B illustrates an example embodiment of a display 100 for displaying a color image including a pixel that works similarly to the grayscale pixel of FIG. 9A, except that the pixel includes groups (or "sub-pixels") of red interferometric modulators 101, 102, 103, green interferometric modulators 104, 105, 106, and blue interferometric modulators 107, 108, 109. For example, the pixel is responsive to a 9-bit signal in which three groups of 3 bits each correspond to the three colors. As another example, in a 12-bit color display, four of the twelve bits correspond to each of sixteen intensities of red, green, and blue that are produced by red, green, or blue interferometric modulators.

Such grayscale or color displays have more display elements to address than does a monochrome display. In order to address these display elements for such embodiments of gray or color displays, the number of conduits (or "driver connections" or "addressing lines" or "leads") to the display typically increases. For example, the display 90 of FIG. 9A has three row driver connections and one column driver connection for a total of four driver connections (i.e., twice as many connections as the display 80 of FIG. 8), and the display 100 of FIG. 9B has three row driver connections and three column driver connections for a total of six driver connections (i.e., thrice as many connections as the display 80 of FIG. 8). Increasing the number of driver connections generally disadvantageously increases the cost of the display device.

In certain embodiments, the number of driver connections to each display element is maintained while the number of driver connections to each pixel may be reduced by using one or more switches that allow selective actuation of some or all of the interferometric modulators by multiplexing among the display elements. In certain embodiments, a switch comprises an electrode, a first contact, and a second contact. One of the first contact and the second contact is configured to communicate with a voltage supply. The first contact is responsive to voltages applied to the electrode of the switch to selectively move between a first position in which the first contact and the second contact are not in communication with one another and a second position in which the first contact and the second contact are in communication with one another. For example, when the switch is in a first position, voltage from the voltage supply cannot be applied to interferometric modulators in electrical communication with the second contact, and when the switch is in a second position, voltage from the voltage supply may be applied to the interferometric modulators in electrical communication with the second contact. The switches can therefore be used to selectively actuate the interferometric modulators, thereby multiplexing among the interferometric modulators and allowing for increased bit density without increasing the number of driver connections.

FIG. 10A illustrates an example embodiment of a display 1000 including a plurality of display elements and switches that multiplex among the display elements. Each switch comprises an electrode 1005 and contacts 1001 and 1002. The contact 1001 is configured to communicate with a voltage supply upstream of the driver connection 1010. The contact 1002 is configured to communicate with one or more corresponding display elements. In the top and middle switches, the contact 1001 is responsive to electrostatic forces in the direction of the arrow 1020 created by voltages applied to the electrode 1005 of the switch to selectively move between a first position in which the first contact 1001 and the second contact 1002 are not in communication with one another (e.g., as illustrated by the top switch of FIG. 10A) and a second position in which the first contact 1001 and the second contact 1002 are in communication with one another (e.g., as illustrated by the middle switch of FIG. 10A). In the bottom switch, the contact 1002 is responsive to electrostatic forces in the direction of the arrow 1020 created by voltages applied to the electrode 1005 of the switch to selectively move between a first position in which the first contact 1001 and the second contact 1002 are not in communication with one another (e.g., as illustrated by the bottom switch of FIG. 10A) and a second position in which the first contact 1001 and the second contact 1002 are in communication with one another (not illustrated). The contact 1001 or the second contact 1002 may thus be considered the "first" contact in accordance with certain embodiments described herein. Voltages from the conduit 1010 in combination with voltages applied through the conduits 1011, 1012, 1013, 1014, 1015, 1016 may selectively actuate certain display elements while the display elements that do not receive a certain voltage from the conduit 1010 or the conduits 1011, 1012, 1013, 1014, 1015, or 1016 are not actuated. In the display 1000 of FIG. 10A, a voltage through the conduit 1010 is applied only to the middle display elements because their corresponding switch is actuated, and voltages are applied through the conduits 1011, 1013, 1014, and 1015, thereby actuating and darkening the display elements.

In certain embodiments, the switch further comprises a third contact. The first contact is responsive to the voltages applied to the electrode of the switch to selectively move between a first position in which the second and third contacts are not in communication with one another and a second position in which the second and third contacts are in communication with one another. In certain embodiments, the second and third contacts are in communication with one another in the second position through the first contact. Such an embodiment may be advantageous for applications where it is desirable for the contact that is responsive to the electrode to be electrically isolated from the contacts that allow voltage to flow to one or more interferometric modulators.

FIG. 10B illustrates an example embodiment of a display 1050 including a plurality of display elements and switches that multiplex among the display elements. Each switch comprises an electrode 1055 and contacts 1051, 1052, and 1053. The contact 1053 is configured to communicate with a voltage supply upstream of the driver connection 1010. The contact 1052 is configured to communicate with one or more corresponding display elements. The contact 1051 is responsive to electrostatic forces in the direction of the arrow 1060 created by voltages applied to the electrode 1055 of the switch to selectively move between a first position in which the contact 1051, the contact 1052, and the contact 1053 are not in communication with one another (e.g., as illustrated by the top switch of FIG. 10B) and a second position in which the contact 1051, the contact 1052, and the contact 1053 are in communication with one another (e.g., as illustrated by the middle and bottom switches of FIG. 10B). In the middle and bottom switches illustrated in FIG. 10B, the contact 1052 and the contact 1053 are in communication with one another through the contact 1051. The contact 1051 may be considered the "first" contact in accordance with certain embodiments described herein, although it will be appreciated that modifications are possible wherein the contact 1052 and/or the contact 1053 are considered the "first" contact. Voltages from the conduit 1010 in combination with voltages applied through the conduits 1011, 1012, 1013, 1014, 1015, 1016 may selectively actuate certain display elements while the display elements that do not receive a certain voltage from the conduit 1010 or the conduits 1011, 1012, 1013, 1014, 1015, or 1016 are not actuated. In the display 1000 of FIG. 10B, a voltage through the conduit 1010 is applied only to the middle and bottom display elements because their corresponding switch is actuated, and voltages are applied through the conduits 1011, 1013, 1014, and 1015, thereby actuating and darkening the display elements. Although described for switches for directing voltages to interferometric modulators, it will be appreciated that the embodiments described herein can also be suitable for forming other types of switches.

Forming a display device that comprises a plurality of display elements and one or more switches typically involves the use of specialized deposition, removal, and patterning steps for forming the display elements and the switches. In certain embodiments in accordance with the disclosure herein, forming a switch comprises a first set of patterning steps and forming a plurality of display elements in parallel electrical communication with the switch (e.g., with the second contact of the switch) comprises a second set of patterning steps that comprises the first set of patterning steps. As used herein, the term "patterning step" is to be given its broadest ordinary meaning including, but not limited to, a series of one or more steps or sub-steps including a pattern formation step.

In an example embodiment described below and in FIGS. 11A through 11I, the second set of patterning steps comprises eight patterning steps that create both a switch and a plurality of display elements from a substrate. The following eight patterning steps are exemplary only and are to be given their broadest possible interpretation. Skilled artisans will recognize that it may be possible to add, modify, reorder, and delete some or all of the patterning steps while remaining compatible with certain embodiments described herein. For example, the deposition of a layer or a material may include the deposition of a plurality of layers or materials.

In certain embodiments, the first patterning step forms an electrode in each of the display elements and forms the electrode and the second contact in the switch. The first patterning step of certain embodiments includes depositing a first conductive layer, forming a first patterned layer that covers portions of the first conductive layer and that does not cover other portions of the first conductive layer, removing the portions of the first conductive layer not covered by the first patterned layer, and removing the first patterned layer. In certain embodiments, the first conductive layer comprises a transparent conductive layer, for example indium tin oxide (ITO), and a partially reflective layer, such as chromium, molybdenum, alloys of chromium and molybdenum, and thin layers of high absorption metals. In certain embodiments, depositing the first conductive layer comprises one or more steps including chemical vapor deposition (CVD), atomic layer deposition (ALD), physical vapor deposition (e.g., sputtering, thermal evaporation, electron-beam evaporation), coating (e.g., spinning on, spraying on), plating (e.g., electroplating), combinations of the same, and the like. In some embodiments, the deposition is plasma-enhanced. In some embodiments, the first conductive layer is flattened (e.g., by chemical mechanical polishing and/or etchback).

In certain embodiments, forming a first patterned layer that covers portions of the first conductive layer comprises photolithography steps, including coating (e.g., spin-on coating) the first conductive layer with a photosensitive material (e.g., positive and/or negative photoresist), exposing portions of the photosensitive material to light (e.g., light at a specific wavelength), and removing the portions of the photosensitive material that were exposed to light (e.g., for positive photoresist) or the portions of the photosensitive material that were not exposed to light (e.g., for negative photoresist). A reticle or mask may be used to expose only portions of the photosensitive material with light. Forming the first patterned layer may further comprise one or more baking steps (e.g., soft bake, post-exposure bake, hard bake, and the like). In some embodiments, forming the first patterned layer comprises electron-beam ("E-beam") lithography steps, x-ray lithography steps, inkjet printing steps, or any other pattern formation steps that can suitably define the features of the display elements and the switch.

In certain embodiments, removing the portions of the first conductive layer comprises chemically etching the portions of the first conductive material not covered by the first patterned layer. The etching may be wet and/or dry etching and may be plasma-enhanced. The etching species may be designed to create an isotropic or an anisotropic profile in the first conductive layer. The etching species may be designed to etch certain materials. For example, CR-14S, available from Cyantek Corp. of Fremont, Calif. and composed of ceric ammonium nitrate, acetic acid, and water, is known to etch chromium, while a mixture of ferric chloride and hydrochloric acid is known to etch ITO. In some embodiments, the etching species is designed to selectively etch some materials but not others. For example, the mix of ferric chloride and hydrochloric acid mentioned above is known to etch ITO preferentially to silicon dioxide at a ratio of over 100 to 1. Etching the substrate may thereby be advantageously avoided to mitigate an amount of scattering of light reflected by the interferometric modulator.

In certain photolithography embodiments, removing the first patterned layer comprises ashing, wet stripping, combinations of the same, or the like. Ashing may comprise reacting the photosensitive material with a source of oxygen (e.g., oxygen plasma, ozone, water vapor). Wet stripping may comprise exposing the photosensitive material to reactive species and/or solvents. Other photosensitive material removal processes are also possible, for example, but not limited to, patterning steps that do not employ photolithography to form the first patterned layer.

FIG. 11A illustrates an example structure after the first patterning step in which an electrode 1106 and a second contact 1108 have been formed in the switch 1102 and an electrode 1110 has been formed in each of the display elements 1104 (depicted as a single display element for simplicity) on a substrate 1101. In the illustrated embodiment, the switch 1102 further comprises a third contact 1109.

In certain embodiments, the second patterning step forms an insulating layer over the electrode in each of the display elements and over the electrode in the switch. The second patterning step of certain embodiments includes depositing an insulating material, for example over the first conductive layer, forming a second patterned layer that covers portions of the insulating material and that does not cover other portions of the insulating material, removing the portions of the insulating material not covered by the second patterned layer, and removing the second patterned layer. In certain embodiments, the insulating material comprises a transparent oxide layer (e.g., silicon oxide, aluminum oxide, chromium oxide, combinations of the same, and the like) and/or a transparent nitride layer (e.g., silicon nitride, silicon oxynitride, combinations of the same, and the like). In certain embodiments, depositing the insulating material comprises CVD, ALD, sputtering, coating, combinations of the same, and the like. In some embodiments, the deposition is plasma-enhanced.

In certain embodiments, forming the second patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the insulating material not covered by the second patterned layer comprises wet and/or dry etching, as described above, with the etching species designed to etch the insulating material. In certain photolithography embodiments, removing the second patterned layer comprises removing photosensitive material similarly to the processes described for removing a photolithographically-defined first patterned layer (e.g., ashing, wet stripping) with any appropriate changes (e.g., different process times).

FIG. 11B illustrates an example structure after the second patterning step in which a portion 1112 of the insulating layer has been formed over the electrode 1106 in the switch 1102 and a portion 1114 of the insulating layer has been formed over the electrode 1110 in each of the display elements 1104 (depicted as a single display element for simplicity). Preferably, the second contact 1108 in the switch 1102 is not substantially covered by the portion 1112 of the insulating layer in order to permit physical contact between the second contact 1108 and the first contact 1126, described below. In embodiments comprising a third contact 1109 in the switch 1102, the third contact 1109 preferably is not substantially covered by the portion 1112 of the insulating layer in order to permit physical contact between the third contact 1109 and the first contact 1126, described below.

In certain embodiments, the third patterning step forms a first sacrificial layer over the electrode in each of the display elements. The third patterning step of certain embodiments includes depositing a first sacrificial material, for example over the insulating layer, forming a third patterned layer that covers portions of the first sacrificial material and that does not cover other portions of the first sacrificial material, removing the portions of the first sacrificial material not covered by the third patterned layer, and removing the third patterned layer. In certain embodiments, the first sacrificial material comprises molybdenum, silicon, tungsten, titanium, photoresist, combinations of the same, and the like. In certain embodiments, depositing the first sacrificial material comprises CVD, ALD, sputtering, coating, combinations of the same, and the like. In some embodiments, the deposition is plasma-enhanced. In some embodiments, the thickness of the first sacrificial material influences the spectral reflectance of the interferometric modulators. In such embodiments, deposition processes with high levels of accuracy are preferred. In some embodiments, the first sacrificial material is flattened (e.g., by chemical mechanical polishing and/or etchback). It will be appreciated that in embodiments in which a layer comprises photoresist, the patterning step comprises forming a pattern by removing the sacrificial material directly rather than forming a patterned layer covering portions of the sacrificial material.

In certain embodiments, forming the third patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the first sacrificial material not covered by the third patterned layer comprises wet and/or dry etching, as described above, with the etching species designed to etch the first sacrificial layer. In certain photolithography embodiments, removing the third patterned material comprises removing photosensitive material similarly to the processes described for removing a photolithographically-defined first patterned layer (e.g., ashing, wet stripping) with any appropriate changes (e.g., different process times).

FIG. 11C illustrates an example structure after the third patterning step in which a first sacrificial layer 1116 has been formed over the electrode 1110 in each of the display elements 1104 (depicted as a single display element for simplicity).

In certain embodiments, the fourth patterning step forms a second sacrificial layer over the electrode in each of the display elements and over the electrode in the switch. The fourth patterning step of certain embodiments includes depositing a second sacrificial material, for example over the first sacrificial layer, forming a fourth patterned layer that covers portions of the second sacrificial material and that does not cover other portions of the second sacrificial material, removing the portions of the second sacrificial material not covered by the fourth patterned layer, and removing the fourth patterned layer. In certain embodiments, the second sacrificial material comprises molybdenum, silicon, tungsten, titanium, photoresist, combinations of the same, and the like. The second sacrificial material may or may not be the same as the first sacrificial material. In certain embodiments, depositing the second sacrificial material comprises CVD, ALD, sputtering, coating, combinations of the same, and the like. In some embodiments, the deposition is plasma-enhanced. In some embodiments, the thickness of the second sacrificial material influences the spectral reflectance of the interferometric modulators. In such embodiments, deposition processes with high levels of accuracy are preferred. In some embodiments, the second sacrificial material is flattened (e.g., by chemical mechanical polishing and/or etchback).

In certain embodiments, forming the fourth patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the second sacrificial material not covered by the fourth patterned layer comprises wet and/or dry etching, as described above, with the etching species designed to etch the second sacrificial material. In certain photolithography embodiments, removing the fourth patterned layer comprises removing photosensitive material similarly to the processes described for removing a first photolithographically-defined patterned layer (e.g., ashing, wet stripping) with any appropriate changes (e.g., different process times).

FIG. 11D illustrates an example structure after the fourth patterning step in which a portion 1118 of the second sacrificial layer has been formed over the electrode 1106 in the switch 1102 and a portion 1120 of the second sacrificial layer has been formed over the electrode 1110 in each of the display elements 1104 (depicted as a single display element for simplicity).

In certain embodiments, the fifth patterning step forms a third sacrificial layer over the electrode in each of the display elements and over the electrode and the second contact in the switch. The fifth patterning step of certain embodiments includes depositing a third sacrificial material, for example over the second sacrificial layers, forming a fifth patterned layer that covers portions of the third sacrificial material and that does not cover other portions of the third sacrificial material, removing the portions of the third sacrificial material not covered by the fifth patterned layer, and removing the fifth patterned layer. In certain embodiments, the third sacrificial material comprises molybdenum, silicon, tungsten, titanium, photoresist, combinations of the same, and the like. The third sacrificial material may or may not be the same as the first and/or second sacrificial materials. In certain embodiments, depositing the third sacrificial material comprises CVD, ALD, sputtering, coating, combinations of the same, and the like. In some embodiments, the deposition is plasma-enhanced. In some embodiments, the thickness of the third sacrificial material influences the spectral reflectance of the interferometric modulators. In such embodiments, deposition processes with high levels of accuracy are preferred. In some embodiments, the third sacrificial material is flattened (e.g., by chemical mechanical polishing and/or etchback).

In certain embodiments, forming the fifth patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the third sacrificial material not covered by the fifth patterned layer comprises wet and/or dry etching, as described above, with the etching species designed to etch the third sacrificial material. In photolithography certain embodiments, removing the fifth patterned layer comprises removing photosensitive material similarly to the processes described for removing a photolithographically-defined first patterned layer (e.g., ashing, wet stripping) with any appropriate changes (e.g., different process times). Flattening of the first, second, and/or third sacrificial materials may advantageously provide a substantially flat surface on which to deposit the second conductive layer, as described below.

FIG. 11E illustrates an example structure after the fifth patterning step in which a portion 1122 of the third sacrificial layer has been formed over the electrode 1106 and the second contact 1108 in the switch 1102 and a portion 1124 of the third sacrificial layer has been formed over the electrode 1110 in each of the display elements 1104 (depicted as a single display element for simplicity). In the illustrated embodiment, the portion 1122 of the third sacrificial layer has also been formed over the third contact 1109 in the switch 1102.

In certain embodiments, the sixth patterning step forms a reflective layer in each of the display elements and the first contact in the switch. The sixth patterning step of certain embodiments includes depositing a second conductive layer, for example over the third sacrificial layer, forming a sixth patterned layer that covers portions of the second conductive layer and that does not cover other portions of the second conductive layer, removing the portions of the second conductive layer not covered by the sixth patterned layer, and removing the sixth patterned layer. In certain embodiments, the second conductive layer comprises aluminum, nickel, gold, silver, copper, combinations of the same (e.g., alloys or a plurality of layers), or the like. In certain embodiments, small percentages of silicon, titanium, tantalum, and/or other materials are added to the second conductive layer achieve specific mechanized properties. In certain embodiments, depositing the second conductive layer comprises CVD, ALD, sputtering, coating, plating, combinations of the same, and the like. In some embodiments, the deposition is plasma-enhanced.

In certain embodiments, forming the sixth patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the second conductive layer not covered by the sixth patterned layer comprises wet and/or dry etching, as described above, with the etching species designed to etch the second sacrificial layer. In certain photolithography embodiments, removing the sixth patterned layer comprises removing photosensitive material similarly to the processes described for removing a photolithographically-defined first patterned layer (e.g., ashing, wet stripping) with any appropriate changes (e.g., different process times).

FIG. 11F illustrates an example structure after the sixth patterning step in which a first contact 1126 has been formed over the electrode 1106 and the second contact 1108 in the switch 1102 and a reflective layer 1128 has been formed over the electrode 1110 in each of the display elements 1104 (depicted as a single display element for simplicity). In the illustrated embodiment, the first contact 1126 has also been formed over the third contact 1109 in the switch 1102. In embodiments in which the first, second, and/or third sacrificial layers have been flattened, the reflective layers 1128 in the display elements 1104 may have more uniform spectral reflectance across their faces and the first contact 1126 may make better contact with the second contact 1108 (and the third contact 1109) in the switch 1102.

In certain embodiments, the seventh patterning step forms a fourth sacrificial layer over at least part of the reflective layer in each of the display elements and over at least part of the first contact in the switch. The seventh patterning step of certain embodiments includes depositing a fourth sacrificial material, for example over the second conductive layer, forming a seventh patterned layer that covers portions of the fourth sacrificial material and that does not cover other portions of the fourth sacrificial material, removing the portions of the fourth sacrificial material not covered by the seventh patterned layer, and removing the seventh patterned layer. In certain embodiments, the fourth sacrificial material comprises molybdenum, silicon, tungsten, titanium, photoresist, combinations of the same, and the like. The fourth sacrificial material may or may not be the same as the first, second, and/or the third sacrificial materials. In certain embodiments, depositing the fourth sacrificial material comprises CVD, ALD, sputtering, coating, combinations of the same, and the like. In some embodiments, the deposition is plasma-enhanced. In certain embodiments, the sacrificial materials beneath the second conductive layer (e.g., the first, second, and third sacrificial materials described above) are deposited with high accuracy while the sacrificial materials above the second conductive layer (e.g., the fourth sacrificial material) are deposited with less accuracy. In some such embodiments, the fourth sacrificial material preferably comprises photoresist, and the deposition of the fourth sacrificial material preferably comprises coating (e.g., spinning on, spraying on) the second conductive layer with a photosensitive material (e.g., positive and/or negative photoresist).

In certain embodiments, forming the seventh patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the fourth sacrificial material not covered by the seventh patterned layer comprises wet and/or dry etching, as described above, with the etching species designed to etch the fourth sacrificial material. In certain photolithography embodiments, removing the seventh patterned layer comprises removing photosensitive material similarly to the processes described for removing a photolithographically-defined first patterned layer (e.g., ashing, wet stripping) with any appropriate changes (e.g., different process times).

FIG. 11G illustrates an example structure after the seventh patterning step in which a portion 1130 of the fourth sacrificial layer has been formed over portions of the first contact 1126 in the switch 1102 and a portion 1132 of the fourth sacrificial layer has been formed over portions of the reflective layer 1128 in each of the display elements 1104 (depicted as a single display element for simplicity). Leaving a portion of the first contact 1126 and the reflective layers 1128 uncovered by the fourth sacrificial layer allows the deformable layer to fuse to the second conductive layer, as described below.

In certain embodiments, the eighth patterning step forms a deformable structure over the reflective layer in each of the display elements and over the first contact in the switch. The eighth patterning step of certain embodiments includes depositing a deformable layer, for example over the fourth sacrificial layer, forming an eighth patterned layer that covers portions of the deformable layer and that does not cover other portions of the deformable layer, removing the portions of the deformable layer not covered by the eighth patterned layer, and removing the eighth patterned layer. In certain embodiments, the deformable layer comprises aluminum, nickel, titanium, copper, combinations of the same (e.g., alloys or a plurality of multiple layers), or the like. The use of different materials for the deformable layer and the second conductive layer allows for optimization of either or both of the layers for their desired properties, as described above. In certain embodiments, depositing the deformable layer comprises CVD, ALD, sputtering, coating, plating, combinations of the same, and the like. In some embodiments, the deposition is plasma-enhanced. In embodiments in which the fourth sacrificial layer leaves portions of the second conductive layer uncovered, the deformable layer may fuse to the second conductive layer.

In certain embodiments, forming the eighth patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the deformable layer not covered by the eighth patterned layer comprises wet and/or dry etching, as described above, with the etching species designed to etch the deformable layer. In certain photolithography embodiments, removing the eighth patterned layer comprises removing photosensitive material similarly to the processes described for removing a photolithographically-defined first patterned layer (e.g., ashing, wet stripping) with any appropriate changes (e.g., different process times).

FIG. 11H illustrates an example structure after the eighth patterning step in which a deformable structure 1134 has been formed over the first contact 1126 in the switch 1102 and a deformable structure 1136 has been formed over the reflective layer 1128 in each of the display elements 1104 (depicted as a single display element for simplicity).

Removal of the first, second, third, and fourth sacrificial layers allows the first contact and the reflective layers to be movable. In certain embodiments, removal of the sacrificial layers comprises wet and/or dry etching with a species that can selectively etch the sacrificial materials (e.g., xenon difluoride ($XeF_2$)). In certain embodiments, removal of the sacrificial layers comprises wet and/or dry etching with a species that can selectively remove the sacrificial materials (e.g., ashing and/or wet stripping as described above). In embodiments in which the sacrificial layers comprise different materials, removal of the first, second, third, and fourth sacrificial layers comprises a sequence of removal steps, each adapted to remove at least one of the sacrificial layers. For example, in an embodiment in which the fourth sacrificial layer comprises photoresist and the first, second, and third sacrificial layers comprise molybdenum, the removal may comprise ashing with oxygen to remove the fourth sacrificial layer and etching with $XeF_2$ to remove the first, second, and third sacrificial layers. FIG. 11I illustrates a display device 1100 after the first, second, third, and fourth sacrificial materials have been removed. In certain embodiments, the first contact 1126 is in contactless electrical communication with the electrode 1106 of the switch 1102. In certain embodiments in which the first contact 1126 is electrically coupled to the second contact 1108 and the third contact 1109, voltage may flow between the third contact 1109 and the second contact 1108 through the first contact 1126.

In certain embodiments, forming the display device 1100 further comprises, preferably before removal of the sacrificial materials (e.g., following formation of the structure of FIG. 11H), a ninth patterning step and a tenth patterning step. In certain embodiments, the ninth patterning step forms a fifth sacrificial layer over the deformable structure in each of the display elements and over the deformable structure in the switch. The ninth patterning step of certain embodiments includes depositing a fifth sacrificial material over the deformable layer, forming a ninth patterned layer that covers portions of the fifth sacrificial material and that does not cover other portions of the fifth sacrificial material, removing the portions of the fifth sacrificial material not covered by the ninth patterned layer, and removing the ninth patterned layer. In certain embodiments, the fifth sacrificial material comprises molybdenum, silicon, tungsten, titanium, photoresist, combinations of the same, and the like. The fifth sacrificial material may or may not be the same as the first, second, third, and/or fourth sacrificial materials. In certain embodiments, depositing the fifth sacrificial material comprises CVD, ALD, sputtering, coating, combinations of the same, and the like. In some embodiments, the deposition is plasma-enhanced.

In some embodiments, a second insulating layer is deposited, for example over the fifth sacrificial material, in order to insulate the third conductive layer, described below, from the deformable layer. It will be appreciated that a second insulating layer may be challenging to deposit on some sacrificial materials (e.g., photoresist). In certain embodiments, the second insulating layer comprises an oxide layer (e.g., silicon oxide, aluminum oxide, chromium oxide, combinations of the same, and the like) and/or a nitride layer (e.g., silicon nitride, silicon oxynitride, combinations of the same, and the like). In certain embodiments, depositing the second insulating layer comprises CVD, ALD, sputtering, coating, combinations of the same, and the like. In some embodiments, the deposition is plasma-enhanced.

In certain embodiments, forming the ninth patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the fifth sacrificial material not covered by the ninth patterned layer comprises wet and/or dry etching, as described above, with the etching species designed to etch the fifth sacrificial layer. In certain photolithography embodiments, removing the ninth patterned layer comprises removing photosensitive material similarly to the processes described for removing a photolithographically-defined first patterned layer (e.g., ashing, wet stripping) with any appropriate changes (e.g., different process times).

FIG. 12A illustrates an example structure after the ninth patterning step in which a portion 1138 of the fifth sacrificial layer has been formed over the first contact 1126 in the switch 1102 and a portion 1140 of the fifth sacrificial layer has been formed over portions of the reflective layer 1128 in each of the display elements 1104 (depicted as a single display element for simplicity).

In certain embodiments, the tenth patterning step forms a bus layer over the fifth sacrificial layer in each of the display elements and a second electrode over the fifth sacrificial layer in the switch. The tenth patterning step of certain embodiments includes depositing a third conductive layer, for example over the fifth sacrificial layer, forming a tenth patterned layer that covers portions of the third conductive layer and that does not cover other portions of the third conductive layer, removing the portions of the third conductive layer not covered by the tenth patterned layer, and removing the tenth patterned layer. In certain embodiments, the third conductive layer comprises ITO, aluminum, nickel, gold, silver, copper, combinations of the same (e.g., alloys or a plurality of layers), or the like. Conductive materials with a high elastic modulus are preferred. It will be appreciated that the third conductive layer does not need to be optically transmissive. In some embodiments, the composition of the fifth sacrificial material will influence selection of the composition for the third conductive material. For example, in embodiments in which the fifth sacrificial material comprises photoresist, the third conductive material will likely not be ITO. The use of different materials for the deformable structures and the third conductive layer allows for optimization of either or both of the layers for their desired properties, as described above. In certain embodiments, depositing the third conductive layer comprises CVD, ALD, sputtering, coating, plating, combinations of the same, and the like. In certain embodiments, the tenth patterning step forms a bus structure (or "bus layer") 1144 over the display elements 1104 and a second electrode 1142 over the first contact 1126 in the switch 1102. In certain embodiments, the tenth patterning step forms a second display element electrode in each display element.

In certain embodiments, forming the tenth patterned layer comprises photolithography steps similar to those used forming the first patterned layer (e.g., coating, exposing, and developing) with any appropriate changes (e.g., different reticle mask, photosensitive material, exposure conditions, and the like) or other suitable pattern formation processes. In certain embodiments, removing the portions of the third conductive layer not covered by the tenth patterned layer comprises wet and/or dry etching, as described above, with the etching species designed to etch the deformable layer. In certain photolithography embodiments, removing the tenth patterned layer comprises removing photosensitive material similarly to the processes described for removing a photolithographically-defined first patterned layer (e.g., ashing, wet stripping) with any appropriate changes (e.g., different process times).

FIG. 12B illustrates an example structure after the tenth patterning step in which a second electrode 1142 has been formed over the first contact 1126 in the switch 1102 and a bus structure 1144 has been formed over the display elements 1104 (depicted as a single display element for simplicity). Skilled artisans will appreciate that suitable structures (e.g., insulating posts) may be formed to support the second electrode 1142 and the bus structure 1144 in such embodiments. For example, in the embodiment illustrated in FIG. 12B, support posts 1146 have been formed to support the bus structure 1144. The second insulating layer, for example, may insulate the third conductive layer from the deformable layer. Selectively configuring the third conductive layer to be or not to be in electrical communication with the second conductive layer allows selective routing of electrical signals. For example, the second and third conductive layers are not connected on the left side of the display elements 1104 but are connected on the right side of the display elements 1104.

Removal of the first, second, third, fourth, and fifth sacrificial layers allows the first contact and the reflective layers to be movable. In certain embodiments, removal of the fifth sacrificial layers comprises wet and/or dry etching with a species that can selectively etch the fifth sacrificial material (e.g., XeF$_2$). In certain embodiments, removal of the sacrificial layers comprises wet and/or dry etching with a species that can selectively remove the sacrificial materials (e.g., ashing and/or wet stripping as described above). In embodiments in which the sacrificial layers comprise different materials, removal of the first, second, third, and fourth sacrificial layers comprises a sequence of removal steps, each adapted to remove at least one of the sacrificial layers. For example, in an embodiment in which the fourth and fifth sacrificial layers comprise photoresist and the first, second, and third sacrificial layers comprise molybdenum, the removal may comprise ashing with oxygen to remove the fourth and fifth sacrificial layers and etching with XeF$_2$ to remove the first, second, and third sacrificial layers. FIG. 12C illustrates a display device 1100 after the first, second, third, fourth, and fifth sacrificial materials have been removed. The fifth sacrificial material may be removed at the same time as the first, second, third, and fourth sacrificial materials (e.g., as illustrated in FIGS. 12A through 12C), or the fifth sacrificial material may be removed at a different time than (e.g., before or after) the first, second, third, and fourth sacrificial materials.

When the second set of patterning steps that form the display elements 1104 do not comprise the first set of patterning steps that form the switch 1102 (e.g., when formation of the switch 1102 includes a step that does not affect the structure of the display elements 1104), certain processing steps can be added to the first set of patterning steps in order to enhance operation of the switch 1102. For example, in order to decrease the effects of stiction between the first contact 1126 and the second contact 1108 when those contacts are in touching electrical communication with one another, the contacting surface of one or both of the first contact 1126 and the second contact 1108 may be roughened. However, when the second set of patterning steps comprises the first set of patterning steps, such roughening would also impact the optical properties of the reflective layers 1128 and is preferably not performed. Additionally, the effects of stiction between the contacts of the switch 1102 may be exacerbated if the switch 1102 utilizes a higher voltage than the display elements 1104.

In certain embodiments, a second electrode 1142 (see FIGS. 12B and 12C) disposed above the first contact 1126 can be used to overcome the effects of stiction by attracting the first contact 1126 away from the electrode 1106. In such embodiments, a movable structure between the first electrode 1106 and the second electrode 1142 is responsive to voltages applied to the first electrode 1106 to selectively move such that the first contact 1126 is in electrical communication with the second contact 1108 and is responsive to voltages applied to the second electrode 1142 to selectively move such that the first contact 1126 and the second contact 1108 are not in electrical communication with one another. In some embodiments, forming the switch 1102 comprises a first set of patterning steps that comprises a third set of patterning steps that form the second electrode 1142 and forming the display elements 1104 comprises a second set of patterning steps that comprises a fourth set of patterning steps that form the bus structure 1144, and the fourth set of patterning steps comprises the third set of patterning steps. Such an approach is advantageous for applications in which the first set of patterning steps comprises the second set of patterning, for example because stiction may be overcome even without a roughening step. Such an approach is also advantageous in embodiments in which the first set of patterning steps does not comprise the second set of patterning steps (e.g., by adding a patterning step that does not form the display elements 1104), for example because stiction may be overcome even without a roughening step (i.e., the roughening step may be removed from the process).

In another example embodiment described below and in FIGS. 13A through 13E, the second set of patterning steps comprises four patterning steps that create both a switch and a plurality of display elements from a substrate. The following four patterning steps are exemplary only and are to be given their broadest possible interpretation. For example, skilled artisans will recognize that it may be possible to add, modify, reorder, and delete some or all of the patterning steps.

In some embodiments, the first and second patterning steps are similar to the first and second patterning steps described above. For example, the first patterning step may include depositing a first conductive material, forming a first patterned layer that covers portions of the first conductive layer and that does not cover other portions of the first conductive layer, removing the portions of the first conductive layer not covered by the first patterned layer, and removing the first patterned layer, and the second patterning step may include depositing an insulating material, forming a second patterned layer that covers portions of the insulating material and that does not cover other portions of the insulating material, removing the portions of the insulating material not covered by the second patterned layer, and removing the second patterned layer. It will be appreciated that the materials, order, and patterning may be adjusted as appropriate for that device.

Figure 13A:
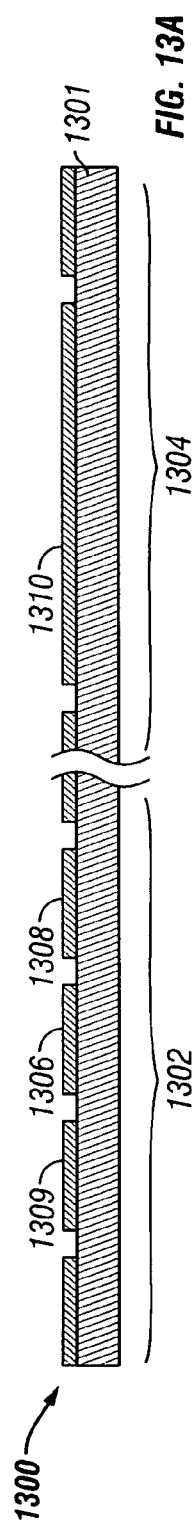

In certain embodiments, the first patterning step forms an electrode in each of the display elements and the electrode and the second contact in the switch. FIG. 13A illustrates an example structure after the first patterning step in which an electrode 1306 and a second contact 1308 have been formed in the switch 1302 and an electrode 1310 has been formed in each of the display elements 1304 (depicted as a single display element for simplicity) on a substrate 1301. In the illustrated embodiment, the switch 1302 further comprises a third contact 1309.

Figure 13B:
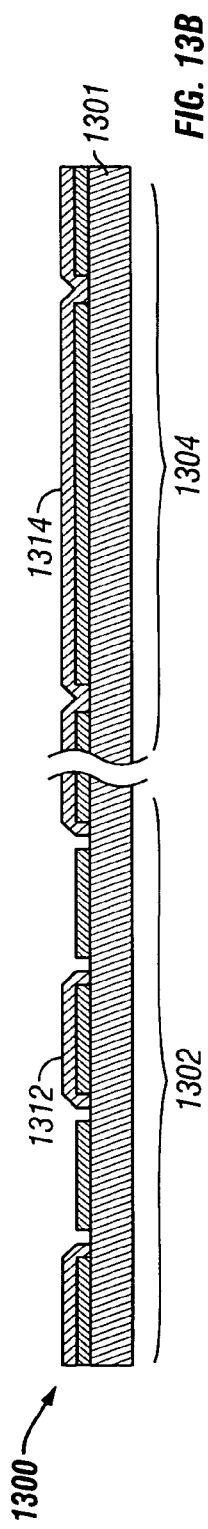

In certain embodiments, the second patterning step forms an insulating layer over the electrode in each of the display elements over the electrode in the switch. FIG. 13B illustrates an example structure after the second patterning step in which a portion 1312 of the insulating layer has been formed over the electrode 1306 in the switch 1302 and a portion 1314 of the insulating layer has been formed over the electrode 1310 in each of the display elements 1304 (depicted as a single display element for simplicity). Preferably, the second contact 1308 in the switch 1302 is not substantially covered by the portion 1312 of the insulating layer in order to permit physical contact between the second contact 1308 and the first contact 1320, described below. In embodiments comprising a third contact 1309 in the switch 1302, the third contact 1309 preferably is not substantially covered by the portion 1312 of the insulating layer in order to permit physical contact between the third contact 1309 and the first contact 1320, described below.

Figure 13C:
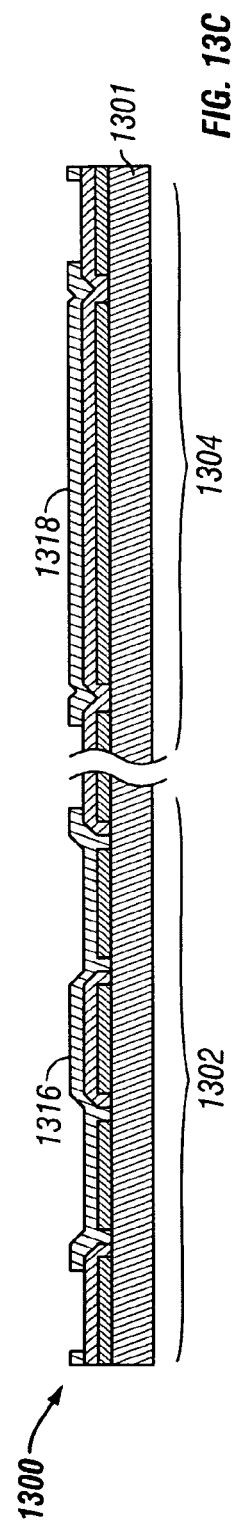

In some embodiments, the third patterning step is similar to the third patterning step described above. For example, the third patterning step may include depositing a first sacrificial material, forming a third patterned layer that covers portions of the first sacrificial material and that does not cover other portions of the first sacrificial material, removing the portions of the first sacrificial material not covered by the third patterned layer, and removing the third patterned layer. It will be appreciated that the materials, order, and patterning may be adjusted as appropriate for that device FIG. 13C illustrates an example structure after a third patterning step in which a first sacrificial layer 1316 has been formed over the electrode 1310 in each of the display elements 1304 (depicted as a single display element for simplicity) and over the electrode 1306 and the first contact 1308 in the switch 1302. In the illustrated embodiment, the first sacrificial layer 1316 has also been formed over the third contact 1309 in the switch 1302.

In some embodiments, the fourth patterning step is similar to the sixth patterning step described above. For example, the fourth patterning step may include depositing a second conductive layer, forming a fourth patterned layer that covers portions of the second conductive layer and that does not cover other portions of the second conductive layer, removing the portions of the second conductive layer not covered by the fourth patterned layer, and removing the fourth patterned layer. It will be appreciated that the materials, order, and patterning may be adjusted as appropriate for that device. For example, the second conductive layer is preferably reflective and suitably deformable in such an embodiment.

Figure 13D:
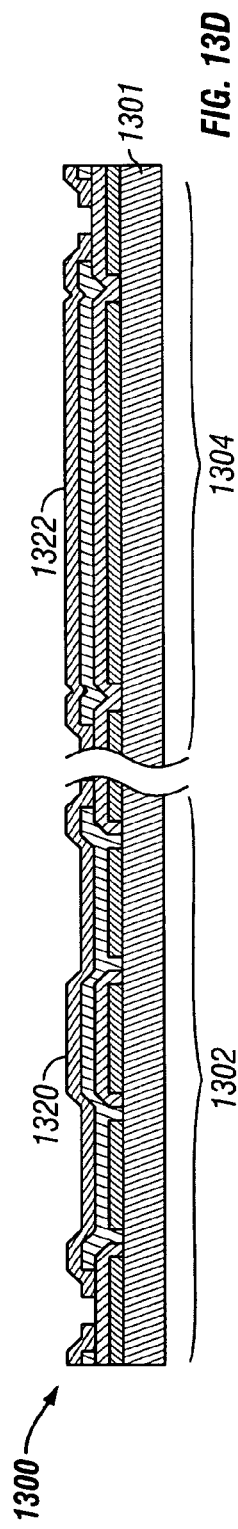

FIG. 13D illustrates an example display device after a fourth patterning step in which a first contact 1320 has been formed over the electrode 1306 and the second contact 1308 in the switch 1302 and a mirror 1322 has been formed over the electrode 1310 in each of the display elements 1304 (depicted as a single display element for simplicity). In the illustrated embodiment, the first contact 1320 has also been formed over the third contact 1309 in the switch 1302. In embodiments in which the first sacrificial layer has been flattened, the mirror 1322 in the display elements 1304 may have more uniform spectral reflectance across their faces and the first contact 1320 may make better contact with the second contact 1308 (and the third contact 1309) in the switch 1302.

Removal of the first sacrificial layers allows the first contact 1320 and the mirrors 1322 to be movable. In certain embodiments, removal of the first sacrificial layers comprises wet and/or dry etching with a species that can selectively etch the sacrificial materials (e.g., xenon difluoride ($XeF_2$)). In certain embodiments, removal of the first sacrificial layers comprises wet and/or dry etching with a species that can selectively remove the sacrificial materials (e.g., ashing and/or wet stripping as described above). FIG. 13E illustrates a display device 1300 after the first sacrificial material has been removed. In certain embodiments, the first contact 1320 is in contactless electrical communication with the electrode 1306 of the switch 1302. In certain embodiments in which the first contact 1320 is electrically coupled to the second contact 1308 and the third contact 1309, voltage may flow between the third contact 1309 and the second contact 1308 through the first contact 1320.

In certain embodiments, forming the display device 1300 further comprises, preferably before removal of the sacrificial materials (e.g., following formation of the structure of FIG. 13D) a fifth patterning step and a sixth patterning step. In some embodiments, the fifth and sixth patterning steps are similar to the ninth and tenth patterning steps described above. For example, the fifth patterning step may include depositing a second sacrificial material, forming a fifth patterned layer that covers portions of the second sacrificial material and that does not cover other portions of the second sacrificial material, removing the portions of the second sacrificial material not covered by the fifth patterned layer, and removing the fifth patterned layer, and the sixth patterning step may include depositing a third conductive layer, forming a sixth patterned layer that covers portions of the third conductive layer and that does not cover other portions of the third conductive layer, removing the portions of the third conductive layer not covered by the sixth patterned layer, and removing the sixth patterned layer. In some embodiments, a second insulating layer is deposited over the second sacrificial material in order to insulate the third conductive layer from the second conductive layer. It will be appreciated that the materials, order, and patterning may be adjusted as appropriate for that device.

FIG. 14A illustrates an example structure after the fifth patterning step in which a portion 1324 of the second sacrificial layer has been formed over the first contact 1320 in the switch 1302 and a second portion 1326 of the sacrificial layer has been formed over portions of the mirror 1322 in each of the display elements 1304 (depicted as a single display element for simplicity). FIG. 14B illustrates an example structure after the sixth patterning step in which a second electrode 1328 has been formed over the first contact 1320 in the switch 1302 and a bus structure 1330 has been formed over the mirror 1322 in each of the display elements 1304 (depicted as a single display element for simplicity). Skilled artisans will appreciate that suitable structures (e.g., insulating posts) may be formed to support the second electrode 1328 and the bus structure 1330 in such embodiments. For example, in the embodiment illustrated in FIG. 14B, support posts 1332 have been formed to support the bus structure 1130. Selectively configuring the third conductive layer to be or not to be in electrical communication with the second conductive layer allows selective routing of electrical signals. For example, the second and third conductive layers are not connected on the left side of the display elements 1304 but are connected on the right side of the display elements 1304.

Removal of the first and second sacrificial layers allows the first contact and the mirrors to be movable. In certain embodiments, removal of the second sacrificial layers comprises wet and/or dry etching with a species that can selectively etch the second sacrificial material (e.g., $XeF_2$). In certain embodiments, removal of the sacrificial layers comprises wet and/or dry etching with a species that can selectively remove the sacrificial materials (e.g., ashing and/or wet stripping as described above). In embodiments in which the sacrificial layers comprise different materials, removal of the first and second sacrificial layers comprises a sequence of removal steps, each adapted to remove at least one of the sacrificial layers. For example, in an embodiment in which the second sacrificial layers comprise photoresist and the first sacrificial layers comprise molybdenum, the removal may comprise ashing with oxygen to remove the second sacrificial layers and etching with $XeF_2$ to remove the first sacrificial layers. FIG. 14C illustrates a display device 1300 after the first and second sacrificial materials have been removed. The second sacrificial layers may be removed at the same time as the first sacrificial layers (e.g., as illustrated in FIGS. 14A through 14C), or the second sacrificial material may be removed at a different time than (e.g., before or after) the first sacrificial material.

When the second set of patterning steps that form the display elements 1304 do not comprise the first set of patterning steps that form the switch 1302 (e.g., when formation of the switch 1302 includes a step that does not affect the structure of the display elements 1304), certain processing steps can be added to the first set of patterning steps in order to enhance operation of the switch 1302. For example, in order to decrease the effects of stiction between the first contact 1320 and the second contact 1308 when those contacts are in touching electrical communication with one another, the contacting surface of one or both of the first contact 1320 and the second contact 1308 may be roughened. However, when the second set of patterning steps comprises the first set of patterning steps, such roughening would also impact the optical properties of the mirrors 1322 and is preferably not performed. Additionally, the effects of stiction between the contacts of the switch 1302 may be exacerbated because switches typically utilize higher voltages than do display elements.

In certain embodiments, a second electrode 1328 (see FIGS. 14B and 14C) disposed above the first contact 1320 of the switch 1302 can be used to overcome the effects of stiction by attracting the first contact 1320 away from the electrode 1306. In such embodiments, a movable structure between the first electrode 1306 and the second electrode 1328 is responsive to voltages applied to the first electrode 1306 to selectively move such that the first contact 1320 is in electrical communication with the second contact 1308 and is responsive to voltages applied to the second electrode 1328 to selectively move such that the first contact 1320 and the second contact 1308 are not in electrical communication with one another. In some embodiments, forming the switch 1302 comprises a first set of patterning steps that comprises a third set of patterning steps that form the second electrode 1328 and forming the display elements 1304 comprises a second set of patterning steps that comprises a fourth set of patterning steps that form the bus structure 1330, and the fourth set of patterning steps comprises the third set of patterning steps. Such an approach is advantageous for applications in which the first set of patterning steps comprises the second set of patterning, for example because stiction may be overcome even without a roughening step. Such an approach is also advantageous in embodiments in which the first set of patterning steps does not comprise the second set of patterning steps (e.g., by adding a patterning step that does not form the display elements 1304), for example because stiction may be overcome even without a roughening step (i.e., the roughening step may be removed from the process).

Various specific embodiments have been described above. Although the invention has been described with reference to these specific embodiments, the descriptions are intended to be illustrative of the invention and are not intended to be limiting. Various modifications and applications may occur to those skilled in the art without departing from the true scope of the invention as defined in the appended claims.

What is claimed is:

1. A method of fabricating a display device, the method comprising:

forming a switch comprising an electrode, a first contact, and a second contact, the switch responsive to voltages applied to the electrode to selectively place the first contact and the second contact in communication with one another, wherein the switch is formed by a first set of patterning steps; and forming a plurality of display elements in parallel electrical communication with the switch, wherein the plurality of display elements is formed by a second set of patterning steps, the second set of patterning steps comprising the first set of patterning steps, wherein the first set of patterning steps comprises a first patterning step that forms the electrode and the second contact in the switch and that forms an electrode in each of the plurality of display elements.

2. The method of claim 1, wherein the plurality of display elements comprises a plurality of interferometric modulators.

3. The method of claim 1, wherein the first contact is responsive to the voltages applied to the electrode to selectively move between a first position in which the first contact and the second contact are not in communication with one another and a second position in which the first contact and the second contact are in communication with one another.

4. The method of claim 1, wherein the switch further comprises a third contact and wherein the first contact is responsive to the voltages applied to the electrode to selectively move between a first position in which the second and third contacts are not in communication with one another and a second position in which the second and third contacts are in communication with one another through the first contact.

5. The method of claim 1, wherein the first set of patterning steps further comprises:

a second patterning step that forms an insulating layer over the electrode in each of the display elements and that forms an insulating layer over the electrode in the switch;

a third patterning step that forms a first sacrificial layer over the electrode in each of the display elements;

a fourth patterning step that forms a second sacrificial layer over the electrode in each of the display elements and that forms a second sacrificial layer over the electrode in the switch;

a fifth patterning step that forms a third sacrificial layer over the electrode in each of the display elements and that forms a third sacrificial layer over the electrode and the second contact in the switch;

a sixth patterning step that forms a mirror in each of the display elements and that forms the first contact in the switch;

a seventh patterning step that forms a fourth sacrificial layer over at least part of the mirror in each of the display elements and that forms a fourth sacrificial layer over at least part of the first contact in the switch; and an eighth patterning step that forms a deformable structure over the mirror in each of the display elements and that forms a deformable structure over the first contact in the switch.

6. The method of claim 5, wherein the second patterning step comprises:
depositing an insulating material;
forming a second patterned layer covering portions of the insulating material;
removing the portions of the insulating material not covered by the second patterned layer; and
removing the second patterned layer.

7. The method of claim 6, wherein depositing the insulating material comprises depositing a transparent oxide layer.

8. The method of claim 6, wherein depositing the insulating material comprises depositing a transparent nitride layer.

9. The method of claim 5, wherein the third patterning step comprises:
depositing a first sacrificial material;
forming a third patterned layer covering portions of the first sacrificial material;
removing the portions of the first sacrificial material not covered by the third patterned layer; and
removing the third patterned layer.

10. The method of claim 5, wherein the fourth patterning step comprises:
depositing a second sacrificial material;
forming a fourth patterned layer covering portions of the second sacrificial material;
removing the portions of the second sacrificial material not covered by the fourth patterned layer; and
removing the fourth patterned layer.

11. The method of claim 5, wherein the fifth patterning step comprises:
depositing a third sacrificial material;
forming a fifth patterned layer covering portions of the third sacrificial material;
removing the portions of the third sacrificial material not covered by the fifth patterned layer; and
removing the fifth patterned layer.

12. The method of claim 5, wherein the sixth patterning step comprises:
depositing a second conductive layer;
forming a sixth patterned layer covering portions of the second conductive layer;
removing the portions of the second conductive layer not covered by the sixth patterned layer; and
removing the sixth patterned layer.

13. The method of claim 12, wherein the second conductive layer comprises aluminum.

14. The method of claim 5, wherein the seventh patterning step comprises:
depositing a fourth sacrificial material;
exposing portions of the fourth sacrificial material; and
removing the unexposed portions of the fourth sacrificial material.

15. The method of claim 5, wherein the seventh patterning step comprises:
depositing a fourth sacrificial material;
forming a seventh patterned layer covering portions of the fourth sacrificial material;
removing the portions of the fourth sacrificial material not covered by the seventh patterned layer; and
removing the seventh patterned layer.

16. The method of claim 5, wherein the eighth patterning step comprises:
depositing a deformable layer;
forming an eighth patterned layer covering portions of the fourth sacrificial layer;
removing the portions of the fourth sacrificial layer not covered by the eighth patterned layer; and
removing the eighth patterned layer.

17. The method of claim 16, wherein the deformable layer comprises aluminum.

18. The method of claim 16, wherein the deformable layer comprises nickel.

19. The method of claim 16, wherein depositing the deformable layer comprises fusing the deformable layer to the mirrors in each of the display elements and to the first contact in the switch.

20. The method of claim 5, further comprising removing the first, second, third, and fourth sacrificial layers.

21. The method of claim 20, wherein removing the first, second, third, and fourth sacrificial layers comprises:
removing the fourth sacrificial layer with a first process having a first chemistry; and
removing the first, second, and third sacrificial layers with a second process having a second chemistry different from the first chemistry.

22. The method of claim 21, wherein the first chemistry comprises oxygen and wherein the second chemistry comprises xenon difluoride ($XeF_2$).

23. The method of claim 5, further comprising:
a ninth patterning step that forms a fifth sacrificial layer over the deformable structure in each of the display elements and that forms a fifth sacrificial layer over the deformable structure in the switch; and
a tenth patterning step that forms a bus layer over the fifth sacrificial layer in each of the display elements and over the fifth sacrificial layer in the switch.

24. The method of claim 23, wherein the ninth patterning step comprises:
depositing a fifth sacrificial material;
forming a ninth patterned layer covering portions of the fifth sacrificial material;
removing the portions of the fifth sacrificial material not covered by the ninth patterned layer; and
removing the ninth patterned layer.

25. The method of claim 24, further comprising depositing a second insulating layer over the fifth sacrificial material.

26. The method of claim 23, wherein the tenth patterning step comprises:

depositing a third conductive layer;
forming a tenth patterned layer covering portions of the third conductive layer;
removing the portions of the third conductive layer not covered by the tenth patterned layer; and
removing the tenth patterned layer 27. The method of claim 23, wherein the tenth patterning step forms a second display element electrode in each display element.

28. The method of claim 23, further comprising removing the fifth sacrificial layer.

29. The method of claim 1, wherein the first patterning step comprises:
depositing a first conductive layer;
forming a first patterned layer covering portions of the first conductive layer;
removing the portions of the first conductive layer not covered by the first patterned layer; and
removing the first patterned layer.

30. The method of claim 29, wherein depositing the first conductive layer comprises depositing a transparent conductive layer.

31. The method of claim 30, wherein the transparent conductive layer comprises indium tin oxide (ITO).

32. The method of claim 30, wherein the transparent conductive layer comprises chromium.

33. The method of claim 1, wherein the first set of patterning steps further comprises:
a second patterning step that forms an insulating layer over the electrode in each of the display elements and that forms an insulating layer over the electrode in the switch;
a third patterning step that forms a first sacrificial layer over the electrode in each of the display elements and that forms a first sacrificial layer over the electrode and the second contact in the switch; and
a fourth patterning step that forms a mirror in each of the display elements and that forms the first contact in the switch.

34. The method of claim 33, further comprising removing the first sacrificial layer.

35. The method of claim 33, further comprising:
a fifth patterning step that forms a second sacrificial layer over the mirror in each of the display elements and that forms a second sacrificial layer over the first contact in the switch; and
a sixth patterning step that forms a bus layer over the second sacrificial layer in each of the display elements and over the second sacrificial layer in the switch.

36. The method of claim 35, further comprising removing the second sacrificial layer.

37. The method of claim 1, wherein the plurality of display elements in parallel electrical communication with the second contact of the switch comprises between about 1 and 10 display elements.

38. A display device fabricated by the method of claim 1.

39. The display device of claim 38, further comprising:
a processor configured to communicate with a display of the display device, the processor configured to process image data; and
a memory device configured to communicate with the processor.

40. The display device of claim 39, further comprising a driver circuit configured to send at least one signal to the display.

41. The display device of claim 40, further comprising a controller configured to send at least a portion of the image data to the driver circuit.

42. The display device of claim 39, further comprising an image source module configured to send the image data to the processor.

43. The display device of claim 42, wherein the image source module comprises at least one of a receiver, transceiver, and transmitter.

44. The display device of claim 39, further comprising an input device configured to receive input data and to communicate the input data to the processor.

45. The method of claim 1, wherein the first contact is in contactless electrical communication with the electrode of the switch.

46. A method of fabricating a display device, the method comprising:
forming a switch comprising a first electrode, an electrode structure comprising a second electrode, a first contact, and a second contact, the switch responsive to voltages applied to the first electrode in order to move the first contact into electrical communication with the second contact, the switch further responsive to voltages applied to the second electrode in order to move the first contact and the second contact out of electrical communication, wherein the second electrode is formed by a first set of patterning steps; and
forming a plurality of display elements in parallel electrical communication with the switch, the plurality of display elements comprising a bus structure comprising a bus, wherein the bus structure is formed by a second set of patterning steps, the second set of patterning steps comprising the first set of patterning steps, wherein the first set of patterning steps comprises:
the first patterning step that forms a sacrificial layer over the first contact in the switch and that forms a sacrificial layer over the display elements; and
a second patterning step that forms the second electrode over the sacrificial layer in the switch and that forms the bus over the sacrificial layer in the display elements.

47. The method of claim 46, wherein the plurality of display elements comprises a plurality of interferometric modulators.

48. A display device fabricated by the method of claim 46.

49. The display device of claim 48, further comprising:
a processor configured to communicate with a display of the display device, the processor configured to process image data; and
a memory device configured to communicate with the processor.

50. The display device of claim 49, further comprising a driver circuit configured to send at least one signal to the display.

51. The display device of claim 49, further comprising an image source module configured to send the image data to the processor.

52. The display device of claim 49, further comprising an input device configured to receive input data and to communicate the input data to the processor.

* * * * *

UNITED STATES PATENT AND TRADEMARK OFFICE
CERTIFICATE OF CORRECTION

PATENT NO. : 7,684,106 B2  Page 1 of 1
APPLICATION NO. : 11/591809
DATED : March 23, 2010
INVENTOR(S) : Jeffrey B. Sampsell It is certified that error appears in the above-identified patent and that said Letters Patent is hereby corrected as shown below:

On the Title Page at Item (56), Page 1, Column 2, Line 1, under Other Publications, change "Curcuit-Based" to --Circuit-Based--.

At Column 23, Line 56, after "device" insert --.--.

At Column 29, Line 6, in Claim 26, after "layer" insert --.--.

Signed and Sealed this

Sixteenth Day of November, 2010

David J. Kappos
*Director of the United States Patent and Trademark Office*